US011309778B2

(12) United States Patent
Hunstable

(10) Patent No.: US 11,309,778 B2
(45) Date of Patent: Apr. 19, 2022

(54) MULTI-TUNNEL ELECTRIC MOTOR/GENERATOR

(71) Applicant: Linear Labs, LLC, Granbury, TX (US)

(72) Inventor: Fred E. Hunstable, Granbury, TX (US)

(73) Assignee: Linear Labs, Inc., Fort Worth, TX (US)

( * ) Notice: Subject to any disclaimer, the term of this patent is extended or adjusted under 35 U.S.C. 154(b) by 0 days.

(21) Appl. No.: 16/293,515

(22) Filed: Mar. 5, 2019

(65) Prior Publication Data

US 2019/0199185 A1 Jun. 27, 2019

Related U.S. Application Data

(63) Continuation of application No. PCT/US2017/049981, filed on Sep. 1, 2017.

(60) Provisional application No. 62/383,590, filed on Sep. 5, 2016.

(51) Int. Cl.
*H02K 21/12* (2006.01)
*H02K 21/44* (2006.01)
*H02K 15/02* (2006.01)

(52) U.S. Cl.
CPC ......... *H02K 21/125* (2013.01); *H02K 15/022* (2013.01); *H02K 21/12* (2013.01); *H02K 21/44* (2013.01); *H02K 2201/12* (2013.01)

(58) Field of Classification Search
CPC ........ Y10T 29/49009; Y10T 29/49012; H02K 16/00; H02K 47/04; H02K 16/02; H02K 47/20; H02K 16/025; H02K 47/14; H02K 21/125; H02K 15/022; H02K 21/12; H02K 21/44; H02K 2201/12

USPC ....... 310/112–114, 179–180, 156.01–156.83, 310/226; 29/596, 598

See application file for complete search history.

(56) References Cited

U.S. PATENT DOCUMENTS

| | | | |
|---|---|---|---|
| 2,703,370 | A | 3/1955 | Steensen |
| 3,300,663 | A | 1/1967 | Rosaen |
| 3,469,133 | A | 9/1969 | Stcherbatcheff |
| 3,895,245 | A | 7/1975 | Bode |
| 3,973,137 | A | 8/1976 | Drobina |
| 3,979,619 | A | 9/1976 | Whiteley |
| 4,093,906 | A * | 6/1978 | Draxler ................ F02B 61/045 322/51 |
| 4,237,396 | A | 12/1980 | Blenkinsop |

(Continued)

FOREIGN PATENT DOCUMENTS

| CN | 2226352 Y | 5/1996 |
|---|---|---|
| CN | 2452204 Y | 10/2001 |

(Continued)

OTHER PUBLICATIONS

Aydin, Metin, et al., "Design and 3D Electromagnetic Field Anaylsis of Non-slotted and Slotted TORUS Type Axial Flux Surface Mounted Permanent Magnet Disc Machines," IEEE International Electric Machines and Drives Conference, Jun. 17-20, 2001, pp. 645-651.

(Continued)

*Primary Examiner* — Burton S Mullins
(74) *Attorney, Agent, or Firm* — Bill R. Naifeh

(57) ABSTRACT

Disclosed are various embodiments for a motor/generator where the stator is a coil assembly and the rotor is a magnetic toroidal cylindrical tunnel or where the rotor is a coil assembly and the stator is a magnetic toroidal cylindrical tunnel.

4 Claims, 23 Drawing Sheets

(56) References Cited

U.S. PATENT DOCUMENTS

| | | |
|---|---|---|
| 4,371,801 A | 2/1983 | Richter |
| 4,388,547 A | 6/1983 | Gruber |
| 4,441,043 A | 4/1984 | DeCesare |
| 4,488,075 A | 12/1984 | DeCesare |
| 4,538,086 A | 8/1985 | Marsh |
| 4,547,713 A | 10/1985 | Langley et al. |
| 4,629,921 A | 12/1986 | Gavaletz |
| 4,739,201 A | 4/1988 | Brigham et al. |
| 4,814,651 A | 3/1989 | Elris |
| 5,004,944 A | 4/1991 | Fisher |
| 5,099,158 A | 3/1992 | Stuart et al. |
| 5,245,238 A | 9/1993 | Lynch et al. |
| 5,594,289 A | 1/1997 | Minato |
| 5,691,589 A | 11/1997 | Keim et al. |
| 5,821,710 A | 10/1998 | Masuzawa |
| 5,825,113 A | 10/1998 | Lipo |
| 5,886,450 A | 2/1999 | Kuehnle |
| 5,962,947 A | 10/1999 | Suzuki et al. |
| 5,977,684 A | 11/1999 | Lin |
| 6,054,834 A | 4/2000 | Ha |
| 6,093,986 A | 7/2000 | Windhorn |
| 6,104,108 A | 8/2000 | Hazelton |
| 6,163,091 A | 12/2000 | Wasson et al. |
| 6,211,597 B1 | 4/2001 | Nakano |
| 6,388,352 B1 | 5/2002 | Huang |
| 6,462,430 B1 | 10/2002 | Joong |
| 6,531,799 B1 | 3/2003 | Miller |
| 6,664,689 B2 | 12/2003 | Rose |
| 6,664,704 B2 | 12/2003 | Calley |
| 6,774,591 B2 | 8/2004 | Arimitsu et al. |
| 6,803,691 B2 | 10/2004 | Rose |
| 6,806,607 B2 | 10/2004 | Lau |
| 6,891,299 B2 | 5/2005 | Coupart |
| 6,924,574 B2 | 8/2005 | Qu et al. |
| 6,924,579 B2 | 8/2005 | Calley |
| 6,930,421 B2 | 8/2005 | Rose |
| 6,930,422 B2 | 8/2005 | Rose |
| 6,967,424 B2 | 11/2005 | Popov |
| 6,975,055 B2 | 12/2005 | Joong |
| 6,979,925 B2 | 12/2005 | Schwamm |
| 6,998,757 B2 | 2/2006 | Seguchi et al. |
| 7,049,722 B2 | 5/2006 | Rose |
| 7,233,088 B2 | 6/2007 | Wise |
| 7,279,818 B1 | 10/2007 | Wise |
| 7,315,103 B2 | 1/2008 | Qu |
| 7,348,703 B2 | 3/2008 | Bojiuc |
| 7,378,749 B2 | 5/2008 | Moore |
| 7,554,241 B2 | 6/2009 | Rao |
| 7,576,465 B2 | 8/2009 | Bremner |
| 7,732,973 B2 | 6/2010 | Bojiuc |
| 7,755,244 B2 * | 7/2010 | Ley .................. H02K 3/04 310/216.019 |
| 7,765,905 B2 | 8/2010 | Trumper |
| 7,791,242 B2 | 9/2010 | Bojiuc |
| 7,834,503 B2 | 11/2010 | Bojiue |
| 7,898,134 B1 | 3/2011 | Shaw |
| 8,008,821 B2 | 8/2011 | Calley |
| 8,063,528 B2 | 11/2011 | Toot |
| 8,074,922 B2 | 12/2011 | Bojiuc |
| 8,159,104 B1 | 4/2012 | Bojiuc |
| 8,232,695 B2 | 7/2012 | Bojiuc |
| 8,288,916 B2 | 10/2012 | Quere |
| 8,362,731 B2 | 1/2013 | Smith |
| 8,400,037 B2 | 3/2013 | Wojtowicz |
| 8,415,848 B2 | 4/2013 | Calley |
| 8,598,754 B2 | 12/2013 | Lacour |
| 8,816,554 B2 | 8/2014 | Li |
| 8,912,699 B2 | 12/2014 | Kuntz |
| 9,219,962 B2 | 12/2015 | Hunstable |
| 9,287,745 B2 | 3/2016 | Akatsu et al. |
| 9,419,483 B2 | 8/2016 | Hunstable |
| RE46,449 E | 6/2017 | Bojiuc |
| 9,729,016 B1 | 8/2017 | Hunstable |
| 9,825,496 B2 | 11/2017 | Hunstable |
| 9,876,407 B2 | 1/2018 | Walsh |
| 10,125,814 B2 | 11/2018 | Walsh |
| 10,256,680 B2 | 4/2019 | Hunstable |
| 10,263,480 B2 | 4/2019 | Hunstable |
| 10,284,029 B2 | 5/2019 | Hunstable |
| 10,326,343 B2 | 6/2019 | Walsh |
| 10,340,768 B2 | 7/2019 | Walsh |
| 2003/0025417 A1 | 2/2003 | Rose |
| 2004/0027022 A1 | 2/2004 | Weir |
| 2004/0061397 A1 | 4/2004 | Rose |
| 2004/0194286 A1 | 10/2004 | Rose |
| 2004/0195932 A1 | 10/2004 | Rose |
| 2004/0195933 A1 | 10/2004 | Rose |
| 2004/0232800 A1 | 11/2004 | Seguchi et al. |
| 2005/0194855 A1 | 9/2005 | Hasebe |
| 2006/0038454 A1 | 2/2006 | Bojiuc |
| 2006/0055272 A1 | 3/2006 | Lee et al. |
| 2006/0273686 A1 | 12/2006 | Edelson et al. |
| 2007/0228860 A1 | 10/2007 | Rao |
| 2008/0278019 A1 | 11/2008 | Lu et al. |
| 2009/0102305 A1 | 4/2009 | Lu |
| 2009/0224627 A1 | 9/2009 | Hino et al. |
| 2009/0224628 A1 | 9/2009 | Hiwaki et al. |
| 2009/0261675 A1 | 10/2009 | Hsiao et al. |
| 2010/0164422 A1 | 7/2010 | Shu et al. |
| 2010/0289365 A1 | 11/2010 | Bando et al. |
| 2011/0187222 A1 | 8/2011 | Li et al. |
| 2012/0153763 A1 | 6/2012 | Kenji |
| 2012/0286616 A1 | 11/2012 | Li |
| 2013/0249343 A1 | 9/2013 | Hunstable |
| 2014/0070651 A1 | 3/2014 | Gelfast |
| 2014/0191612 A1 | 7/2014 | Mariotto |
| 2015/0001976 A1 | 1/2015 | Hunstable |
| 2015/0137647 A1 | 5/2015 | Hunstable |
| 2015/0171694 A1 | 6/2015 | Walsh |
| 2016/0020652 A1 | 1/2016 | Hunstable |
| 2016/0079833 A1 * | 3/2016 | Okada .................. H02K 15/03 29/598 |
| 2016/0094096 A1 * | 3/2016 | Hunstable ................ H02K 1/17 310/154.28 |
| 2016/0380496 A1 * | 12/2016 | Hunstable .............. H02K 21/26 310/179 |
| 2017/0163115 A1 | 6/2017 | Gotz |
| 2017/0222494 A1 * | 8/2017 | Hunstable ................ H02K 3/12 |
| 2017/0237325 A1 | 8/2017 | Hunstable |
| 2018/0131244 A1 | 5/2018 | Hunstable |
| 2018/0212486 A1 | 7/2018 | Hunstable |
| 2018/0219464 A1 | 8/2018 | Newmark et al. |
| 2018/0278134 A1 | 9/2018 | Hunstable |
| 2018/0331593 A1 | 11/2018 | Hunstable |
| 2019/0103793 A1 | 4/2019 | Walsh |
| 2019/0229563 A1 | 7/2019 | Hunstable |
| 2019/0260243 A1 | 8/2019 | Hunstable |
| 2019/0312497 A1 | 10/2019 | Walsh |
| 2021/0066984 A1 | 3/2021 | Hunstable et al. |
| 2021/0067016 A1 | 3/2021 | Hunstable et al. |

FOREIGN PATENT DOCUMENTS

| | | |
|---|---|---|
| CN | 101005229 A | 7/2007 |
| CN | 102687378 A | 9/2012 |
| CN | 102761179 A | 10/2012 |
| CN | 102792569 A | 11/2012 |
| CN | 103683768 A | 3/2014 |
| CN | 104272559 A | 1/2015 |
| CN | 104285366 A | 1/2015 |
| CN | 109891726 A | 6/2019 |
| CN | 109891726 B | 3/2021 |
| DE | 102010024344 A1 | 12/2011 |
| EP | 0729663 B1 | 5/2001 |
| EP | 1191673 A2 | 3/2002 |
| EP | 1990894 A2 | 11/2008 |
| JP | S51133709 | 11/1976 |
| JP | S5492305 | 12/1977 |
| JP | S61173658 A | 8/1986 |
| JP | S61144782 | 9/1986 |
| JP | 2002369473 A | 12/2002 |
| JP | 2006217771 A | 8/2006 |
| JP | 2008141853 A | 6/2008 |
| JP | 2010166741 A | 7/2010 |

(56) References Cited

FOREIGN PATENT DOCUMENTS

| | | |
|---|---|---|
| JP | 2010-226937 A | 10/2010 |
| JP | 2019-527022 A | 9/2019 |
| KR | 101276633 B1 | 6/2013 |
| WO | 2008006906 A1 | 1/2008 |
| WO | 2008096913 A1 | 8/2008 |
| WO | 2011032675 A2 | 3/2011 |
| WO | 2014188737 A1 | 11/2014 |
| WO | 2016014717 A1 | 1/2016 |
| WO | 2016164818 A1 | 10/2016 |
| WO | 2017003955 A1 | 1/2017 |
| WO | 2017070403 A1 | 4/2017 |
| WO | 2018045360 A1 | 3/2018 |
| WO | 2020150536 A1 | 7/2020 |

OTHER PUBLICATIONS

Aydin, Metin, et al., "Performance Evaluation of an Axial Flux Consequent Pole PM Motor using Finite Element Analysis," IEEE International Electric Machines and Drives Conference, vol. 3, Jun. 1-4, 2003, pp. 1682-1687.

Huang, Surong, et al., "TORUS Concept Machines: Pre-Prototyping Design Assessment for Two Major Topologies," IEEE Industry Applications Conference, vol. 3, Sep. 30-Oct. 4, 2001, pp. 1619-1625.

Australian Exam Report, dated May 10, 2016, re Patent App No. 2013235132; 3 pages.

Chinese Office Action, dated Jul. 20, 2016, re Patent App No. 201380022180.7; 9 pages.

Japanese Office Action, dated Jan. 25, 2017, re JP Patent App No. 2015-501894.

International Search Report and Written Opinion of the ISA, dated Aug. 8, 2014, re PCT/US2013/033198.

International Search Report and Written Opinion of the ISA, dated Aug. 18, 2016, re PCT/US2016/026776.

International Search Report and Written Opinion, dated Nov. 3, 2016, by the ISA/RU, re PCT/US2016/039673.

International Search Report and Written Opinion, dated Jan. 9, 2017, by the ISA/US, re PCT/US2016/057999.

Chinese Office Action, dated Apr. 19, 2017, re CN App No. 201380022180.7.

Office Action, dated Jul. 21, 2017, by the USPTO, re U.S. Appl. No. 15/413,228.

Office Action, dated Nov. 6, 2017, by the USPTO, re U.S. Appl. No. 14/866,787.

Final Office Action, dated Mar. 9, 2018, by the USPTO, re U.S. Appl. No. 15/413,228.

International Search Report and Written Opinion, dated Mar. 15, 2018, by the ISA/RU, re PCT/US2017/049981.

Notice of Allowance, dated Mar. 29, 2018, by the USPTO, re U.S. Appl. No. 14/866,787.

Office Action, dated Jun. 27, 2018, by the USPTO, re U.S. Appl. No. 15/008,431.

Office Action, dated Sep. 19, 2018, by the USPTO, re U.S. Appl. No. 15/413,228.

Notice of Allowance, dated Apr. 26, 2018, by the USPTO, re U.S. Appl. No. 14/866,787.

Notice of Allowance, dated Sep. 12, 2018, by the USPTO, re U.S. Appl. No. 14/866,787.

EP Exam Report, dated Apr. 18, 2018, by the EPO, re EP App No. 13714168.5.

EP Search Report, dated Oct. 26, 2018, re EP Patent App No. 16777421.5.

EP Official Action, dated Nov. 13, 2018, by the EPO, re EP App No. 16777421.5.

Notice of Allowance, dated Dec. 26, 2018, by the USPTO, re U.S. Appl. No. 14/866,787.

EP Exam Report, dated Oct. 10, 2018, by the EPO, re EP App No. 13714168.5.

Indian Exam Report, dated Nov. 19, 2018, by IP India, re IN App No. 8335/DELNP/2014.

CA Office Action, dated Jan. 24, 2019, by the CIPO, re CA App No. 2,881,979.

Office Action, dated Feb. 25, 2019, by the USPTO, re U.S. Appl. No. 15/848,540.

EP Extended Search Report, dated Feb. 22, 2019, by the EPO, re EP App No. 16818559.3.

Notice of Allowance, dated Mar. 6, 2019, by the USPTO, re U.S. Appl. No. 15/008,431.

EP Office Action, dated Mar. 12, 2019, by the EPO, re EP App No. 16818559.3.

Notice of Allowance, dated Apr. 10, 2019, by the USPTO, re U.S. Appl. No. 15/413,228.

Extended EP Search Report, dated Apr. 18, 2019, by the EPO, re EP App No. 16858253.4.

Chinese Office Action, dated Apr. 10, 2019, by the CIPO, re CN App No. 201680033171.1.

KR Office Action, dated Jun. 7, 2019, by KIPO, re KR Patent App No. 10-2014-7029089.

EP Exam Report, dated Aug. 9, 2019, by the EPO, re EP Patent App No. 13714168.5.

EP Official Action, dated May 8, 2019, by the EPO, re EP Patent App No. 16858253.4.

Notice of Allowance, dated May 31, 2019, by the USPTO, re U.S. Appl. No. 16/374,132.

Notice of Allowance, dated Jun. 12, 2019, by the USPTO, re U.S. Appl. No. 15/848,540.

CN Office Action, dated Jun. 5, 2019, by the CIPO, re CN Patent App No. 201680050018.X.

Notice of Allowance, dated Jun. 24, 2019, by the USPTO, re U.S. Appl. No. 15/008,431.

Office Action, dated Jun. 27, 2019, by the USPTO, re U.S. Appl. No. 15/813,360.

International Search Report, dated Apr. 16, 2020, by the ISA/RU, re PCT/US2020/013966.

Written Opinion, dated Apr. 16, 2020, by the ISA/RU, re PCT/US2020/013966.

EP Extended Search Report, dated Mar. 17, 2020, by the EPO, re EP App No. 17847669.3.

EP Official Action, dated Apr. 4, 2020, by the EPO, re EP App No. 17847669.3.

CN Office Action, dated Sep. 2, 2020, re CN App No. 201780054222.3.

IN Exam Report, dated May 14, 2021, by the India Patent Office, re IN App No. 2019/17006820.

JP Office Action, dated Jul. 8, 2021, re JP Patent App No. 2019-512779.

* cited by examiner

MULTI-TUNNEL ELECTRIC MOTOR/GENERATOR

RELATED APPLICATIONS

This application is a continuation of International Application No. PCT/US2017/049981, filed Sep. 1, 2017, entitled "AN IMPROVED MULTI-TUNNEL ELECTRIC MOTOR/GENERATOR," which claims priority to U.S. application No. 62/383,590, filed Sep. 5, 2016, entitled "AN IMPROVED TOROIDAL ELECTRIC MOTOR/GENERATOR," the disclosures of which are hereby incorporated by reference for all purposes.

This application is also commonly owned with the following U.S. patent applications: U.S. application No. 62/185,637 entitled "An Improved Electric Motor/Generator," filed on Jun. 28, 2015, U.S. application Ser. No. 15/008,431 entitled "An Improved Multi-Tunnel Electric Motor Generator," filed on Jan. 27, 2016, PCT Application number PCT/US15/26776, entitled "AN IMPROVED MULTI-TUNNEL ELECTRIC MOTOR/GENERATOR" filed on Apr. 8, 2016, U.S. patent application Ser. No. 14/866,788, entitled "An Improved Brushless Electric Motor/Generator," filed on Sep. 25, 2015; U.S. patent application Ser. No. 14/866,787, entitled "An Improved Brushed Electric Motor/Generator," filed on Sep. 25, 2015; U.S. application Ser. No. 14/608,232, entitled "An Improved Brushless Electric Motor/Generator," filed on Jan. 29, 2015; and U.S. application Ser. No. 13/848,048, entitled "An Improved DC Electric Motor/Generator with Enhanced Permanent Magnetic Flux Densities" filed on Mar. 20, 2013, the disclosures of which are hereby incorporated by reference for all purposes.

TECHNICAL FIELD

The invention relates in general to a new and improved electric motor/generator, and in particular to an improved system and method for producing rotary motion from a electro-magnetic motor or generating electrical power from a rotary motion input.

BACKGROUND INFORMATION

Electric motors use electrical energy to produce mechanical energy, very typically through the interaction of magnetic fields and current-carrying conductors. The conversion of electrical energy into mechanical energy by electromagnetic means was first demonstrated by the British scientist Michael Faraday in 1821 and later quantified by the work of Hendrik Lorentz.

A magnetic field is generated when electric charge carriers such as electrons move through space or within an electrical conductor. In a traditional electric motor, a central core of tightly wrapped current carrying material creates magnetic poles (commonly known as the rotor) which spins or rotates at high speed between the fixed poles of a magnet (commonly known as the stator) when an electric current is applied. The central core is typically coupled to a shaft which will also rotate with the rotor. The shaft may be used to drive gears and wheels in a rotary machine and/or convert rotational motion into motion in a straight line.

Generators are usually based on the principle of electromagnetic induction, which was discovered by Michael Faraday in 1831. Faraday discovered that when an electrical conducting material (such as copper) is moved through a magnetic field (or vice versa), an electric current will begin to flow through that material. This electromagnetic effect induces voltage or electric current into the moving conductors.

Current power generation devices such as rotary alternator/generators and linear alternators rely on Faraday's discovery to produce power. In fact, rotary generators are essentially very large quantities of wire spinning around the inside of very large magnets. In this situation, the coils of wire are called the armature because they are moving with respect to the stationary magnets (which are called the stators). Typically, the moving component is called the armature and the stationary components are called the stator or stators.

Rotary motors and generators used today produce or utilize a sinusoidal time varying voltage. This waveform is generally inherent to the operation of these devices.

With conventional motors a pulsed electrical current of sufficient magnitude must be applied to produce a given torque/horsepower. Horsepower output and efficiency then is a function of design, electrical input power plus losses.

With conventional generators, an electrical current is produced when the rotor is rotated. The power generated is a function of flux strength, conductor size, number of pole pieces and speed in RPM.

In motors or generators, some form of energy drives the rotation and/or movement of the rotor. As energy becomes more scarce and expensive, what is needed are more efficient motors and generators to reduce energy consumption or run more efficiently and hence reduce costs.

SUMMARY

In response to this and other problems, there is presented various embodiments disclosed in this application, including methods and systems of increasing flux density by permanent magnet manipulation using multiple magnetic tunnels. Disclosed are various embodiments for a motor/generator comprising: a toroidal magnetic cylinder comprising a first magnetic tunnel segment radially arranged about an axial axis to form a circular path, wherein the first magnetic tunnel segment comprises: a first magnetic wall having a magnetic pole orientation that points generally towards an interior of the first magnetic tunnel segment; a first opposing magnetic wall having a magnetic pole orientation that points generally towards the interior of the first magnetic tunnel segment and positioned along the axial axis a predetermined distance from the first magnetic wall; a first inner magnetic wall generally spanning between the first magnetic wall and the first opposing magnetic wall in a generally axial direction and having a magnetic pole orientation that points generally towards the interior of the first magnetic tunnel segment; a first outer magnetic wall generally spanning between the first magnetic wall and the first opposing magnetic wall in a axial direction, positioned radially away from the first inner magnetic wall, and having a magnetic pole orientation that points generally towards the interior of the first magnetic tunnel segment; wherein like magnetic poles of magnets forming the first inner magnetic wall and magnets forming the first outer magnetic wall are orientated in an opposite direction from the like poles of magnets forming the first magnetic wall and the magnets forming the first opposing magnetic wall; and a coil assembly positioned within the circular path and adapted to move relative to the toroidal magnetic cylinder.

Other embodiments may include the above wherein the toroidal magnetic cylinder further comprises a second magnetic tunnel segment radially arranged about the axial axis positioned adjacent to the first magnetic tunnel segment to form a circular path, wherein the second magnetic tunnel segment comprises: a second magnetic wall having a magnetic pole orientation that points generally towards an interior of the second magnetic tunnel segment; a second opposing magnetic wall having a magnetic pole orientation that points generally towards the interior of the second magnetic tunnel segment and positioned along the axial axis the predetermined distance from the second magnetic wall; a second inner magnetic wall generally spanning between the second magnetic wall and the second opposing magnetic wall in a generally axial direction and having a magnetic pole orientation that points generally towards the interior of the second magnetic tunnel segment; a second outer magnetic wall generally spanning between the second magnetic wall and the second opposing magnetic wall in a axial direction, positioned radially away from the second inner magnetic wall, and having a magnetic pole orientation that points generally towards the interior of the second magnetic tunnel segment; wherein like magnetic poles of magnets forming the second inner magnetic wall and magnets forming the second magnetic wall are orientated in an opposite direction from the like poles of magnets forming the second outer magnetic wall and magnets forming the second opposing ring or magnetic wall, and the like magnetic poles of magnets forming the second magnetic tunnel segment are orientated in an opposite direction from the like magnet poles of the magnets forming the first magnetic tunnel segment.

Other embodiments may include the above wherein the coil assembly further comprises: a ring-like core; a plurality of teeth radially positioned about the ring-like core and extending from the ring-like core to form a plurality of slots; and a plurality of coil windings wherein each coil winding in the plurality of winding is positioned within a slot within the plurality of slots.

Other embodiments may include the above further comprising a back iron circuit generally surrounding the toroidal magnetic cylinder.

Other embodiments may include the above further comprising longitudinal grooves defined in the back iron circuit for positioning and supporting the magnets forming the first outer magnetic wall and the first inner magnetic wall.

Other embodiments may include the above further comprising a hub coupled to the coil assembly and a shaft coupled to the hub.

Other embodiments may include the above further comprising a hub coupled to the toroidal magnetic cylinder and a shaft coupled to the hub.

Other embodiments may include the above further comprising an exterior circumferential slot defined in the toroidal magnetic cylinder to allow for passage of a structural support and/or electrical conductors.

Other embodiments may include the above further comprising an interior circumferential slot defined in the toroidal magnetic cylinder to allow for passage of a structural support and/or electrical conductors.

Other embodiments may include the above further comprising a side circular slot defined in the toroidal magnetic cylinder to allow for passage of a structural support and/or electrical conductors.

Other embodiments may include the above further comprising a means for preventing the magnetic flux forces within the interior of the tunnel from escaping through the slots.

Other embodiments may include the above further comprising: a support ring coupled to the coil assembly and partially extending through the side circular slot; a first end plate coupled to the support ring.

Other embodiments may include the above further comprising: a shaft coupled to the toroidal magnetic cylinder; a second end plate coupled rotatably coupled to the shaft; and a means for connecting the first end plate to the second end plate.

Other embodiments may include the above wherein the first inner magnetic wall, the first outer magnetic wall, the first ring magnetic wall and the first opposing ring magnetic wall may be formed from electromagnets.

Other embodiments may include the above wherein a tangential magnetic force is generated on all sides of individual coils in the plurality of coils when the individual coil is positioned within the first magnetic tunnel segment or second magnetic tunnel segment.

Additionally, there may be a method of producing mechanical rotation, the method characterized by: forming a first area of magnetic concentration within a first interior cavity defined by an first outer magnetic cylinder wall having a first magnetic pole facing the interior cavity, a first inner magnetic cylinder wall having a second magnetic pole facing the interior cavity, a first magnetic side wall having a third magnetic pole facing the interior cavity, and a first opposing magnetic side wall having a fourth magnetic pole facing the interior cavity, wherein the first and second magnetic poles are of opposite polarities from the third and fourth magnetic poles; positioning a coil within the first interior cavity; applying a current in a first direction to the coil to cause the coil to rotate relative to the first interior cavity; coupling a longitudinal shaft to the coil such that as the coil rotates, the longitudinal shaft rotates.

Other embodiments may include the above further comprising: forming a second area of magnetic concentration within a second interior cavity positioned circumferentially adjacent to the first interior cavity defined by an second outer magnetic cylinder wall having a fifth magnetic pole facing the interior cavity, a second inner magnetic cylinder wall having a sixth magnetic pole facing the interior cavity, a second magnetic side wall having a seventh magnetic pole facing the interior cavity, and a second opposing magnetic side wall having a eighth magnetic pole facing the interior cavity, wherein the fifth and sixth magnetic poles are of opposite polarities from the seventh and eight magnetic poles; applying a current in a first direction to the coil to cause the coil to move to the second interior cavity; applying a current in a second direction to the coil when the coil is within the second interior cavity to move the coil out of the second interior cavity; and coupling a longitudinal shaft to the coil such that as the coil rotates from the first interior cavity to the second interior cavity, the longitudinal shaft rotates.

Additionally, there may be disclosed a method for generating an electric current characterized by: forming a first area of magnetic concentration within a first interior cavity defined by an first outer magnetic cylinder wall having a first magnetic pole facing the interior cavity, a first inner magnetic cylinder wall having a second magnetic pole facing the interior cavity, a first magnetic side wall having a third magnetic pole facing the interior cavity, and a first opposing magnetic side wall having a fourth magnetic pole facing the interior cavity, wherein the first and second magnetic poles are of opposite polarities from the third and fourth magnetic poles; rotating a coil within the first interior cavity; and extracting from the coil a current having a first direction as the coil moves through the first interior cavity.

Other embodiments may include the above further comprising: forming a second area of magnetic concentration within a second interior cavity defined by an second outer magnetic cylinder wall having a fifth magnetic pole facing the interior cavity, a second inner magnetic cylinder wall having a sixth magnetic pole facing the interior cavity, a second magnetic side wall having a seventh magnetic pole facing the interior cavity, and a second opposing magnetic side wall having a eighth magnetic pole facing the interior cavity, wherein the fifth and sixth magnetic poles are of opposite polarities from the seventh and eight magnetic poles, wherein the first through fourth magnetic poles have an opposite polarity direction than the fifth through eight magnetic poles; rotating the coil within the second interior cavity; and extracting from the coil a current having a second direction when the coil moves through the second interior cavity.

These and other features, and advantages, will be more clearly understood from the following detailed description taken in conjunction with the accompanying drawings.

It is important to note the drawings are not intended to represent the only aspects of the invention.

DETAILED DESCRIPTION

Specific examples of components, signals, messages, protocols, and arrangements are described below to simplify the present disclosure. These are, of course, merely examples and are not intended to limit the invention from that described in the claims. Well-known elements are presented without a detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding conventional control circuitry, power supplies, or circuitry used to power certain components or elements described herein are omitted, as such details are within the skills of persons of ordinary skill in the relevant art.

When directions, such as upper, lower, top, bottom, clockwise, or counter-clockwise are discussed in this disclosure, such directions are meant to only supply reference directions for the illustrated figures and for relative orientation of components in the figures. The directions should not be read to imply actual directions used in any resulting invention or actual use. Under no circumstances, should such directions be read to limit or impart any meaning into the claims except for relative positioning.

Figure 1:
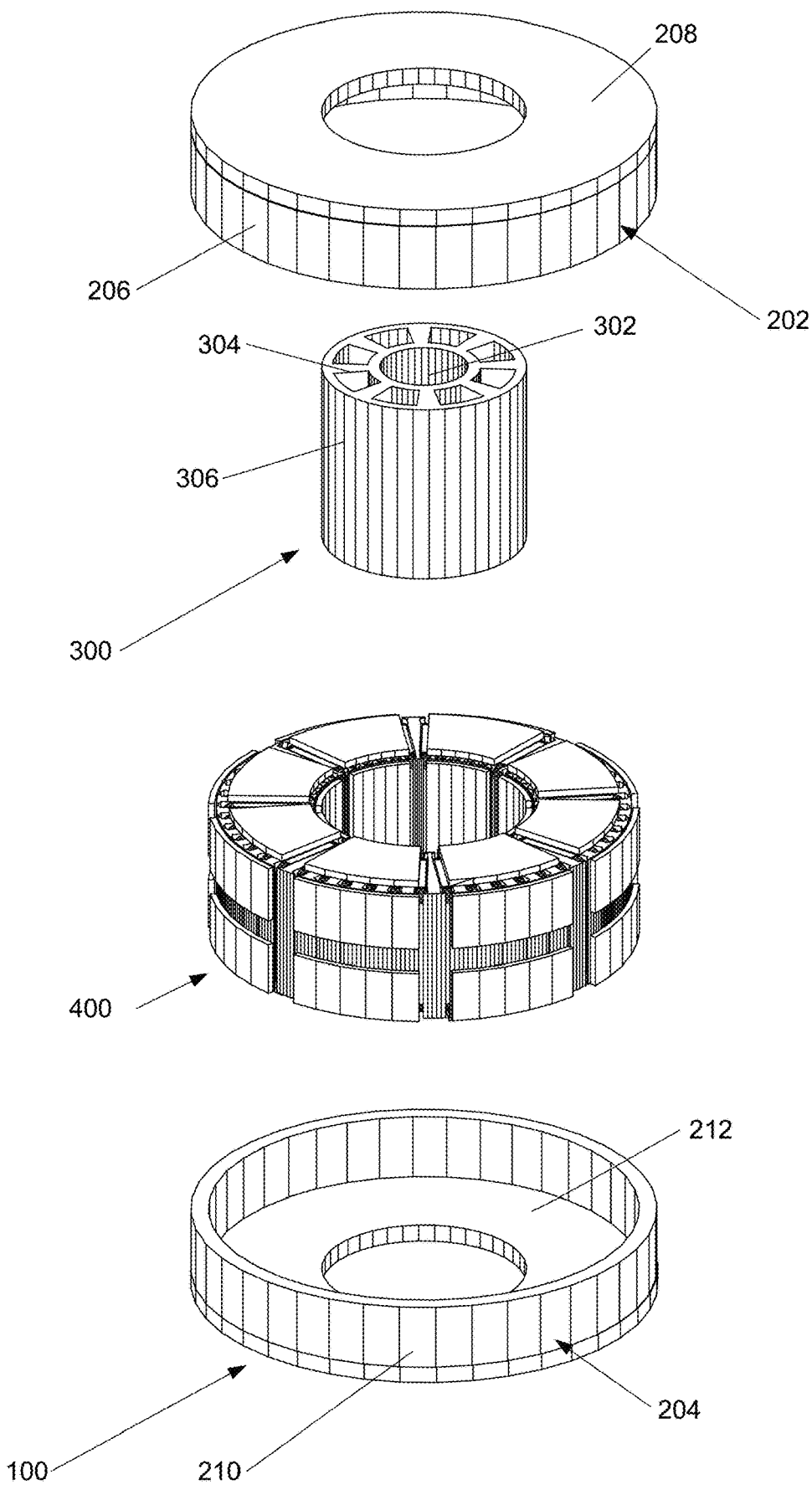
FIG. 1 is an exploded view of one embodiment of a motor/generator component according to certain aspects of the present disclosure.

FIG. 1 is an exploded perspective view of a motor/generator component 100 illustrating a first portion of a back iron circuit 202, a second portion of a back iron circuit 204, a center hub 300, and a magnetic disc assembly 400. The first portion back iron circuit 202 comprises a first cylindrical wall 206 made of back iron material. The first cylinder wall 206 may be coupled or positioned adjacent to a flat side wall 208 which is also made of back iron material. For purposes of this application the term "back iron" may refer to iron or a soft magnetic material, such as any ferrous compound or alloy, such as stainless steel, any nickel or cobalt alloy, soft magnetic material, or any laminated metal comprising laminated sheets of such material.

The second portion of the back iron circuit 204 similarly comprises a second cylindrical wall 210 coupled or positioned to a flat side wall 212. When assembled, the first portion of the back iron circuit 202 and the second portion of the back iron circuit 204 physically surrounds the center hub 300 and the magnetic disc assembly 400. In certain embodiments, the space between the cylindrical walls 206 and 210 define a slot 410 (see FIG. 7B) defined therein to allow the passage of control wires and/or electrical conductors. In yet other embodiments, there may be a similar slot or gap (not shown in FIG. 1) between the cylindrical walls 206 and 210 and the flat side walls 208 and 212, respectively. (See side slot 1410 of FIG. 9A).

In certain embodiments, the hub 300 comprises an inner hub 302 for coupling to a mechanical load transferring device, such as a shaft (not shown). The hub 300 positions and structurally supports the magnetic disc assembly 400 about the shaft (not shown). In this embodiment, a plurality of radial arms 304 couple the inner hub 302 to an outer hub 306. In certain embodiments, the outer hub 306 also comprises a portion of the back iron circuit for the magnetic disc assembly 400.

Figure 2:
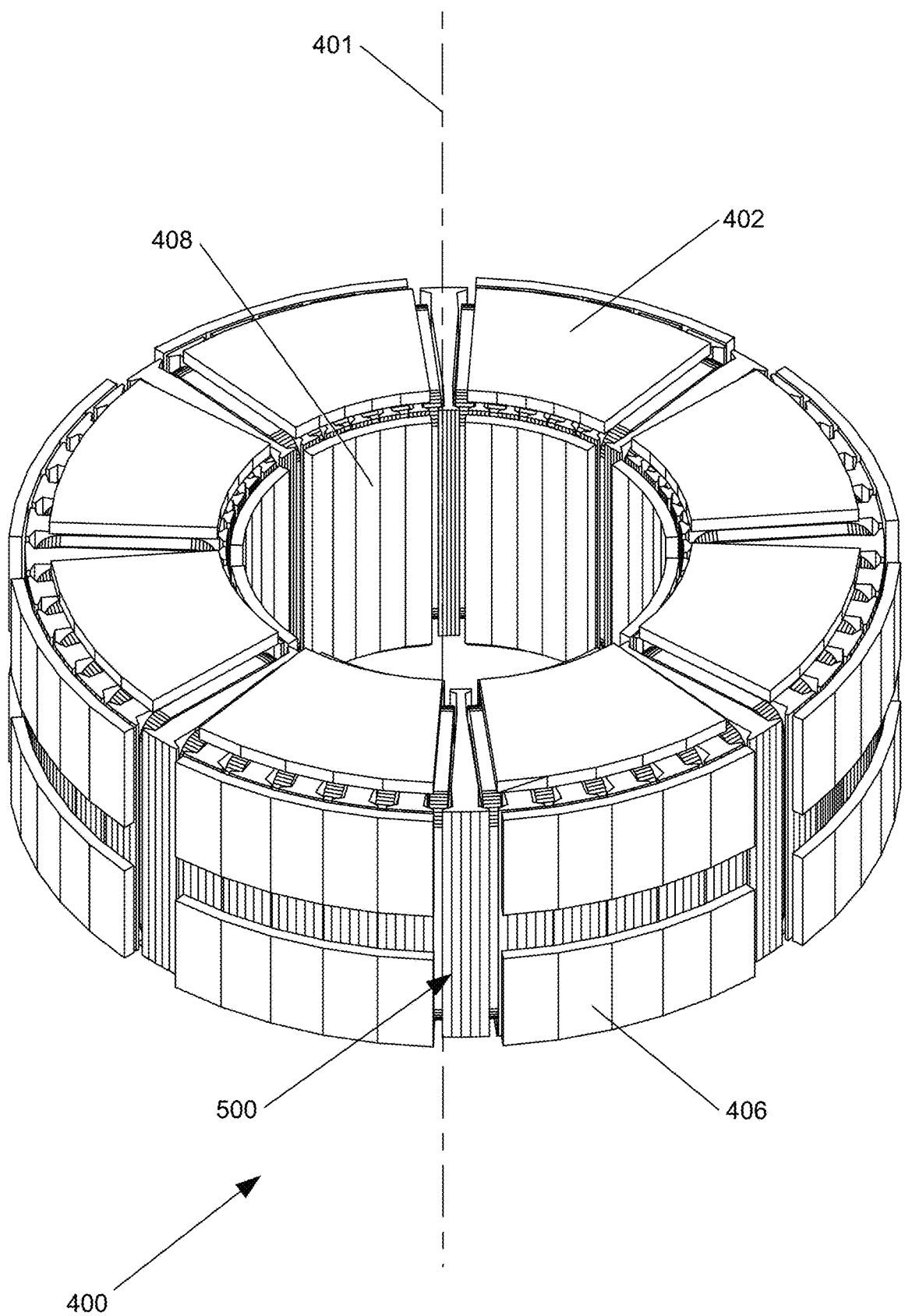
FIG. 2 is a detailed isometric view of a component of the motor/generator component illustrated in FIG. 1.
Figure 3:
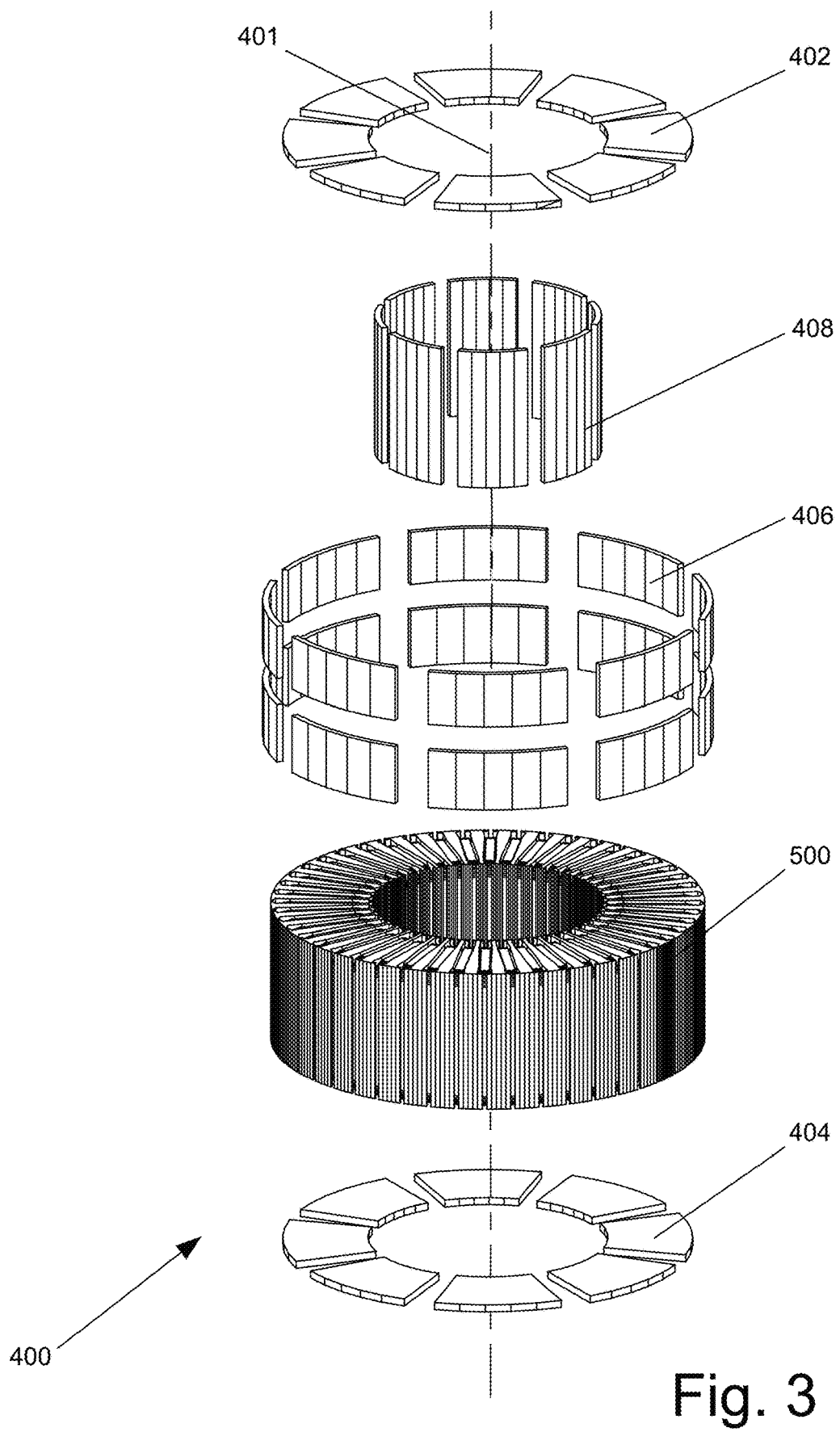
FIG. 3 is an exploded view of the component illustrated in FIG. 2.
Figure 5A:
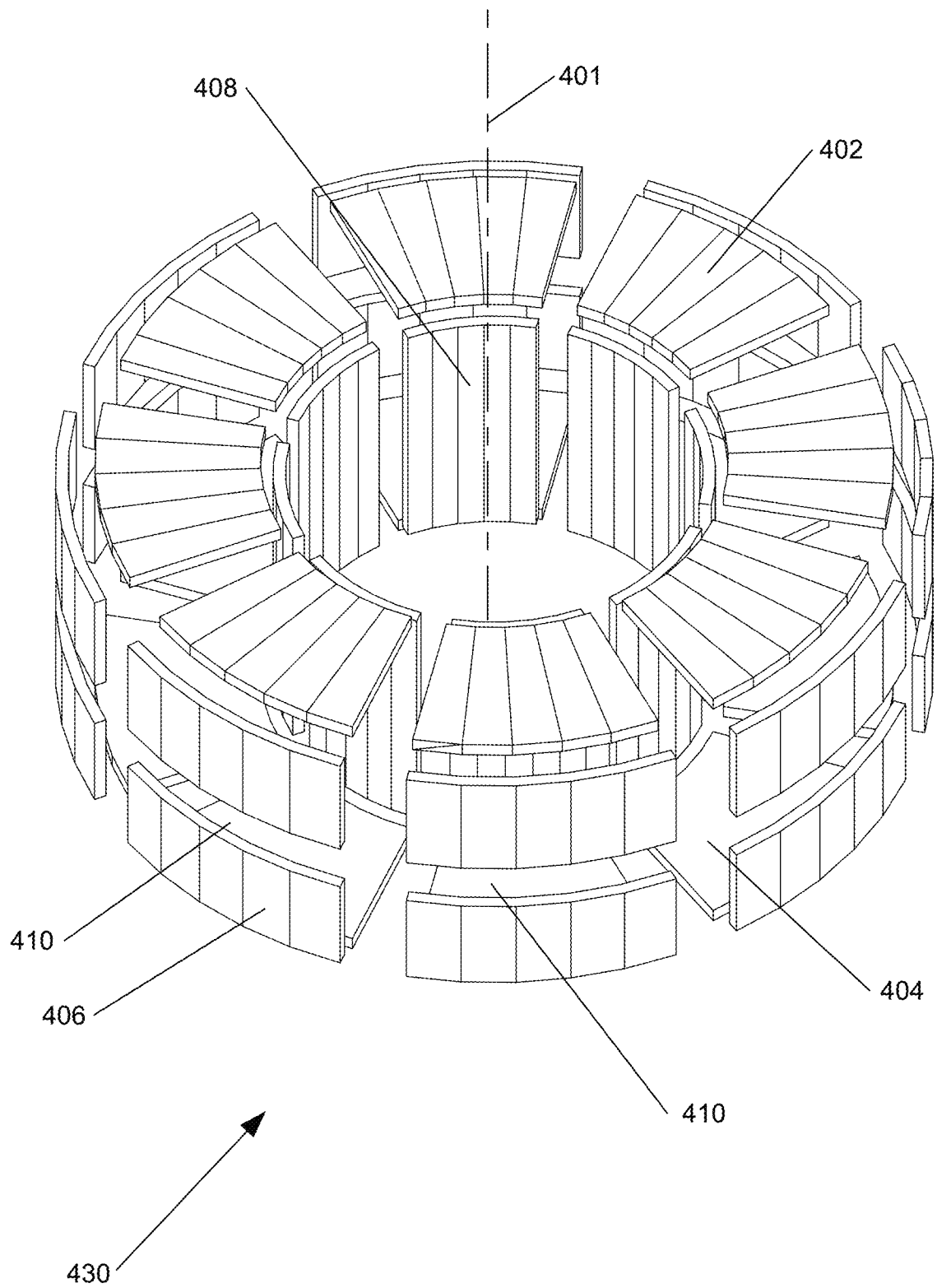
FIG. 5A illustrates a plurality of magnets forming one embodiment of a toroidal magnetic tunnel comprising eight magnetic cylinder segments.

FIG. 2 is a detailed isometric view of one embodiment of the magnetic disc assembly 400. FIG. 3 is an exploded view of the magnetic disc assembly 400. In the embodiment illustrated in FIGS. 2 and 3, with respect to a longitudinal axis 401, there is a top or first side or radial wall of magnets 402. Similarly there is a bottom or second side or radial wall of magnets 404. An outer cylindrical wall or longitudinal ring of magnets 406 is longitudinally positioned between the first radial wall 402 and the second radial wall of magnets 404. An inner cylindrical wall or longitudinal ring of magnets 408 is also longitudinally positioned between the first radial wall 402 and the second radial wall of magnets 404 and laterally or radially positioned within the outer cylindrical wall of magnets 406. When assembled, the magnets forming the radial walls 402-404 and cylindrical walls 408-406 form a toroidal magnetic cylinder, such as illustrated in FIG. 5A.

In certain embodiments, the magnets forming the radial walls 402-404 and cylindrical walls 408-406 discussed herein may be made of out any suitable magnetic material, such as: neodymium, Alnico alloys, ceramic permanent magnets, or electromagnets. The exact number of magnets or electromagnets will be dependent on the required magnetic field strength or mechanical configuration. The illustrated embodiment is only one way of arranging the magnets. Other arrangements are possible, especially if magnets are manufactured for a specific purpose or shape.

A coil assembly 500 is laterally positioned between the outer longitudinal ring or cylindrical wall 406 and the inner longitudinal ring or wall 408 and is longitudinally positioned between the first radial wall 402 and the second radial wall 404. In certain embodiments, the coil assembly 500 may be a stator. In yet other embodiments, the coil assembly 500 may be a rotor.

Figure 4A:
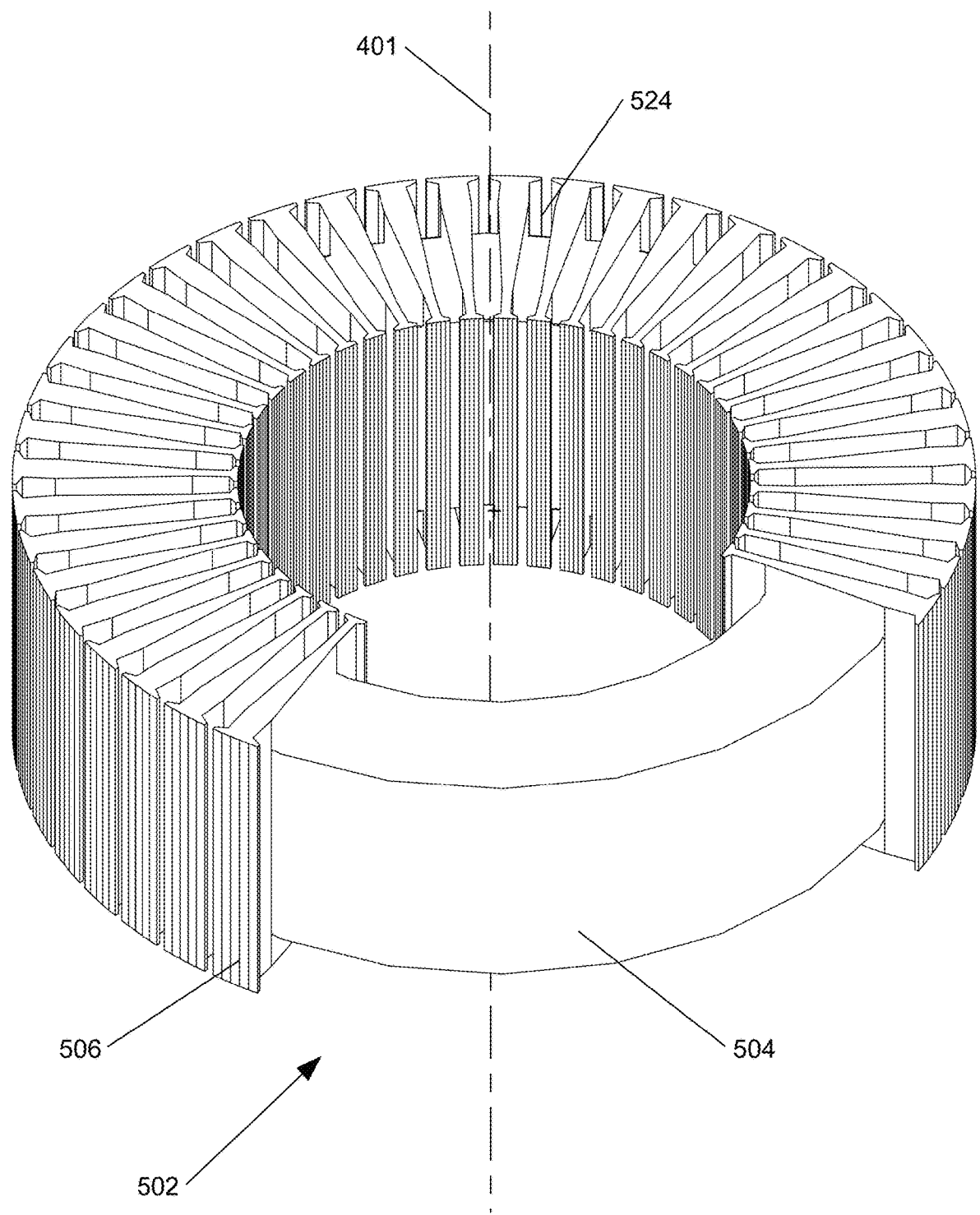
FIG. 4A is an isometric view of a coil assembly illustrating a central core and a plurality of teeth extending from the core where a portion of the teeth have been removed for clarity.

Turning now to FIG. 4A, there is a partial isometric view of a coil assembly support 502, which in one embodiment, may be a portion of a stator used in conjunction with a rotor (or rotor assembly) formed by the magnetic radial walls 402-404 and magnetic longitudinal cylindrical walls 406-408 and the back iron circuit portions 202 and 204 discussed above. In certain embodiments, the coil assembly support 502 comprises a cylindrical or ring core 504 coupled to a plurality of teeth 506 radially spaced about the ring core with respect to the long axis 401. For purposes of clarity, FIG. 4A shows a portion of teeth 506 removed so that the ring core 504 is visible.

In certain embodiments, the ring core 504 may be made out of iron or back iron materials, so that it will act as a magnetic flux force concentrator. However, other core materials maybe used when design considerations such as mechanical strength, reduction of eddy currents, cooling channels, etc. are considered. As discussed above, back iron materials may be iron, an iron alloy, laminated steel iron, or soft magnet materials. In some embodiments, the ring core 504 may be hollow or have passages defined therein to allow liquid or air cooling.

Figure 4B:
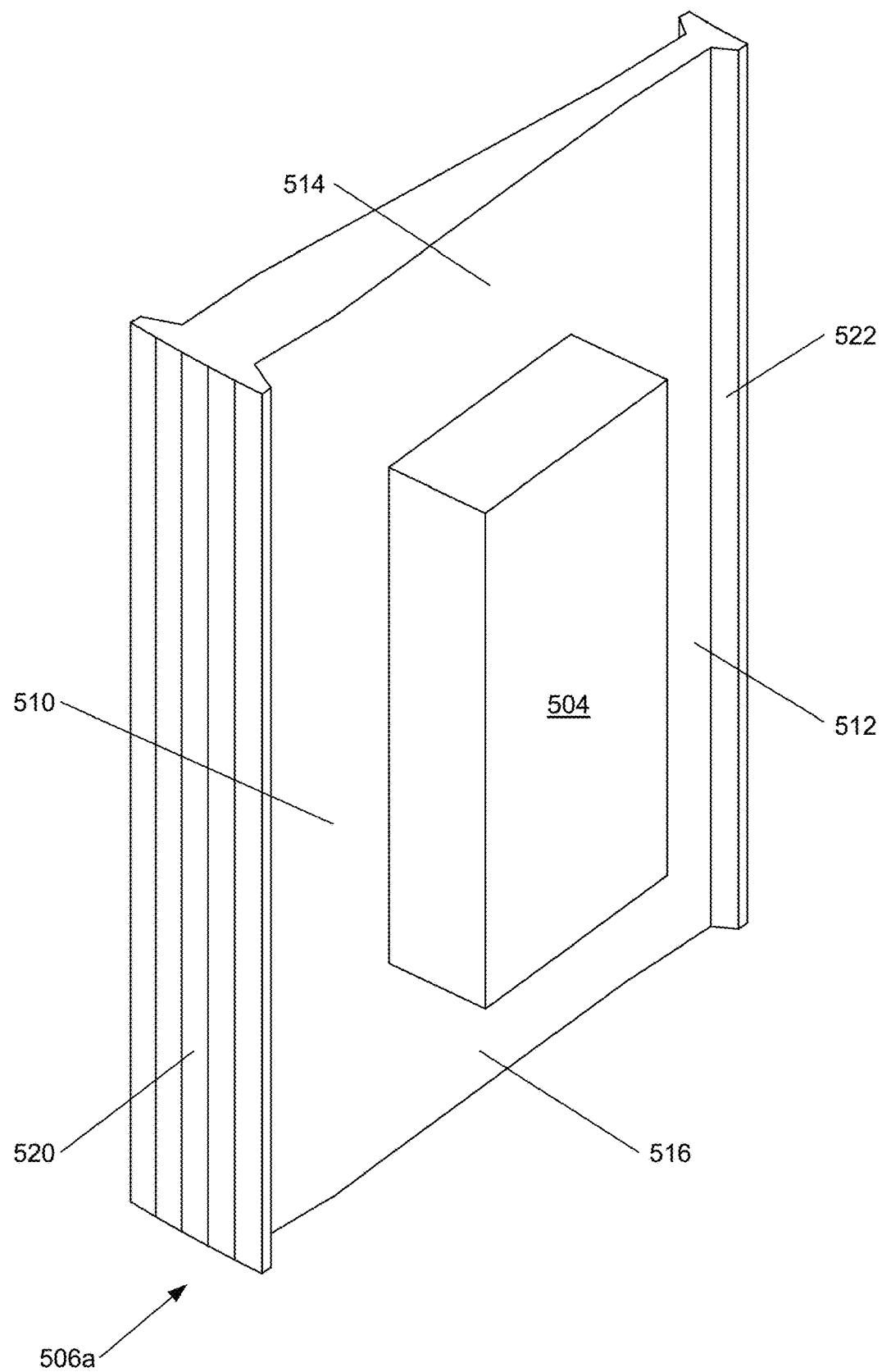
FIG. 4B is a detailed perspective view of a single tooth of the plurality of teeth of FIG. 4A.

One embodiment of an individual tooth 506a and a small portion of the ring core 504 are illustrated in FIG. 4B. The tooth 506a may be made from a material similar to the material forming the core 504 (e.g., back iron material). In the illustrated embodiment, each tooth 506a extends from the ring core 504 in radial (e.g., horizontal) and longitudinal (e.g., vertical) directions. Thus, each tooth 506a comprises an outer portion 510 extending radially away from the longitudinal axis 401 (FIG. 3), an inner portion 512 extending radially toward the longitudinal axis 401, a top portion 514 extending in one longitudinal direction, and a bottom portion 516 extending in the opposing vertical or longitudinal direction. The illustrated portion of the ring core 504 is coupled to and supports the individual tooth 506a.

In certain embodiments, an exterior fin 520 couples to an exterior edge of the outer vertical portion 510 and extends outward from the vertical portion 510 in both circumferential (or tangential) directions with respect to the longitudinal axis 401. Similarly, an interior fin 522 couples to an interior edge of the inner portion 512 and extends outward from the portion 512 in both circumferential (or tangential) directions. As used in this disclosure, the term "circumferential direction" means the tangential or rotational direction about an axis, such as axis 401 (See FIG. 4A).

Figure 4C:
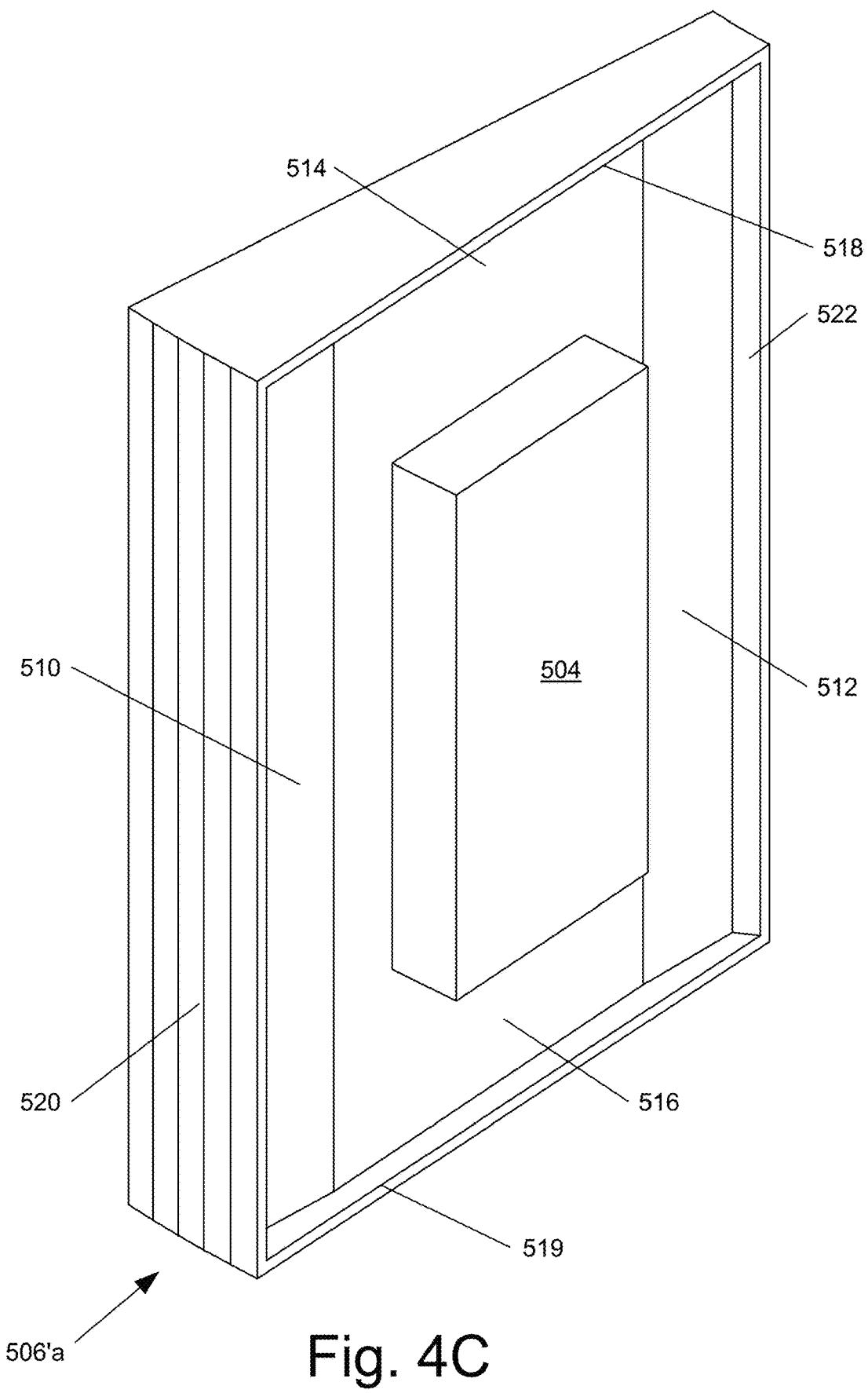
FIG. 4C is a detailed perspective view of an alternative embodiment for the single tooth of the plurality of teeth of FIG. 4A.

An alternative embodiment of an individual tooth 506'a and a small portion of the ring core 504 is illustrated in FIG. 4C. The tooth 506'a is similar to the tooth 506a described above in reference to FIG. 4B except that the tooth 506'a also has horizontal or radial fins extending from the top portion 514 and the lower portion 516. Specifically, a first or top horizontal fin 518 extends in both horizontal circumferential directions from an edge of the top horizontal portion 514. Similarly, a second or bottom horizontal fin 519 extends in both horizontal circumferential directions from an edge of the bottom horizontal portion 516. In other words, the top horizontal fin 518 joins the exterior fin 520 to the interior fin 522 at the top portion of the tooth. Similarly, the bottom horizontal fin 519 joins the exterior fin 520 to the interior fin 522 at the bottom portion of the tooth. From a structural perspective, the thickness of the fins 518 and 519 maybe thicker closer to the joint with the respective horizontal members 514 and 516 and tapers as the fins extend away from the joints.

Figure 4D:
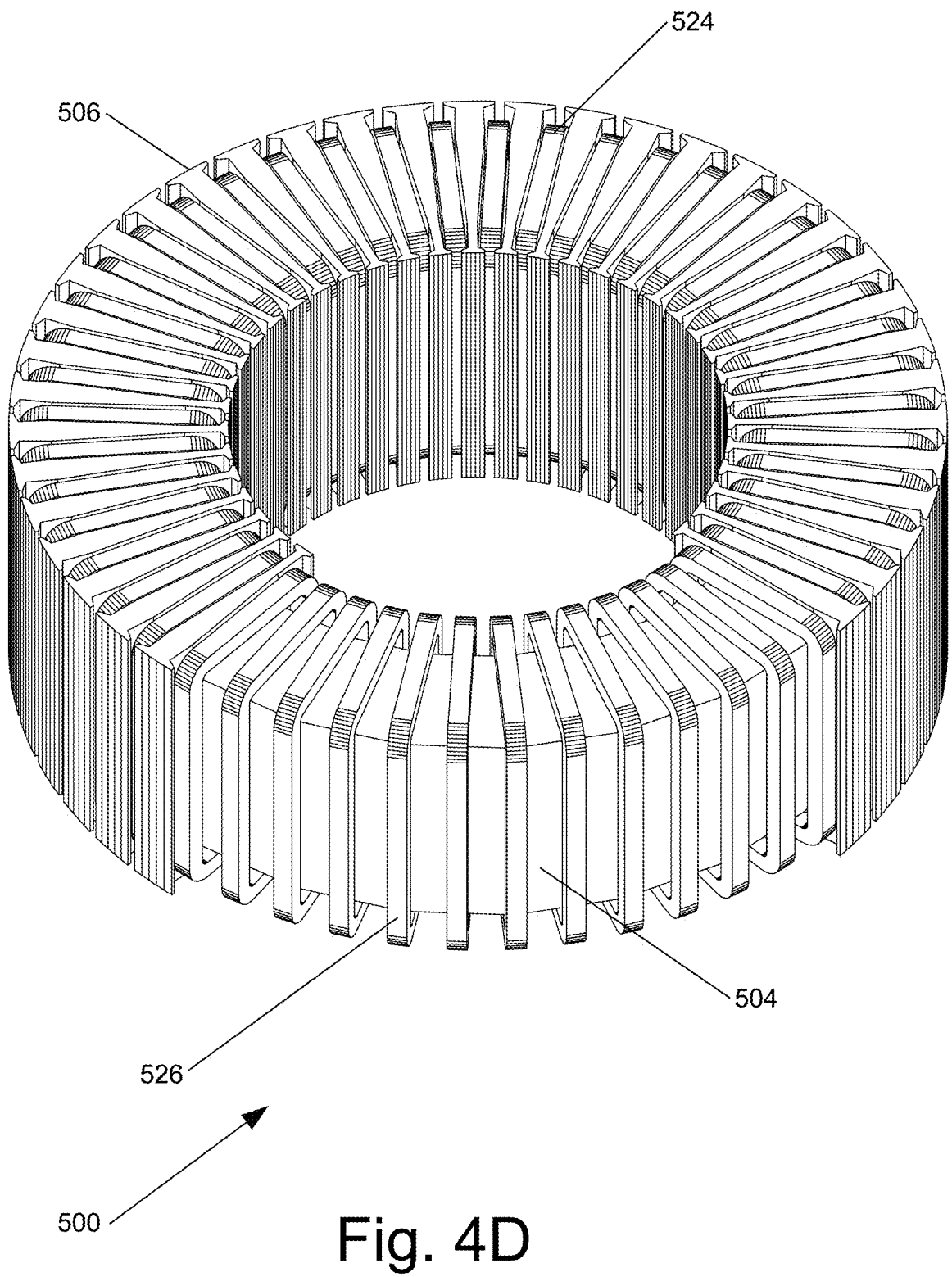
FIG. 4D is an isometric view of the coil assembly of FIG. 4A and a plurality of coil windings where a portion of the rotor/stator teeth have been removed for clarity.
Figure 4E:
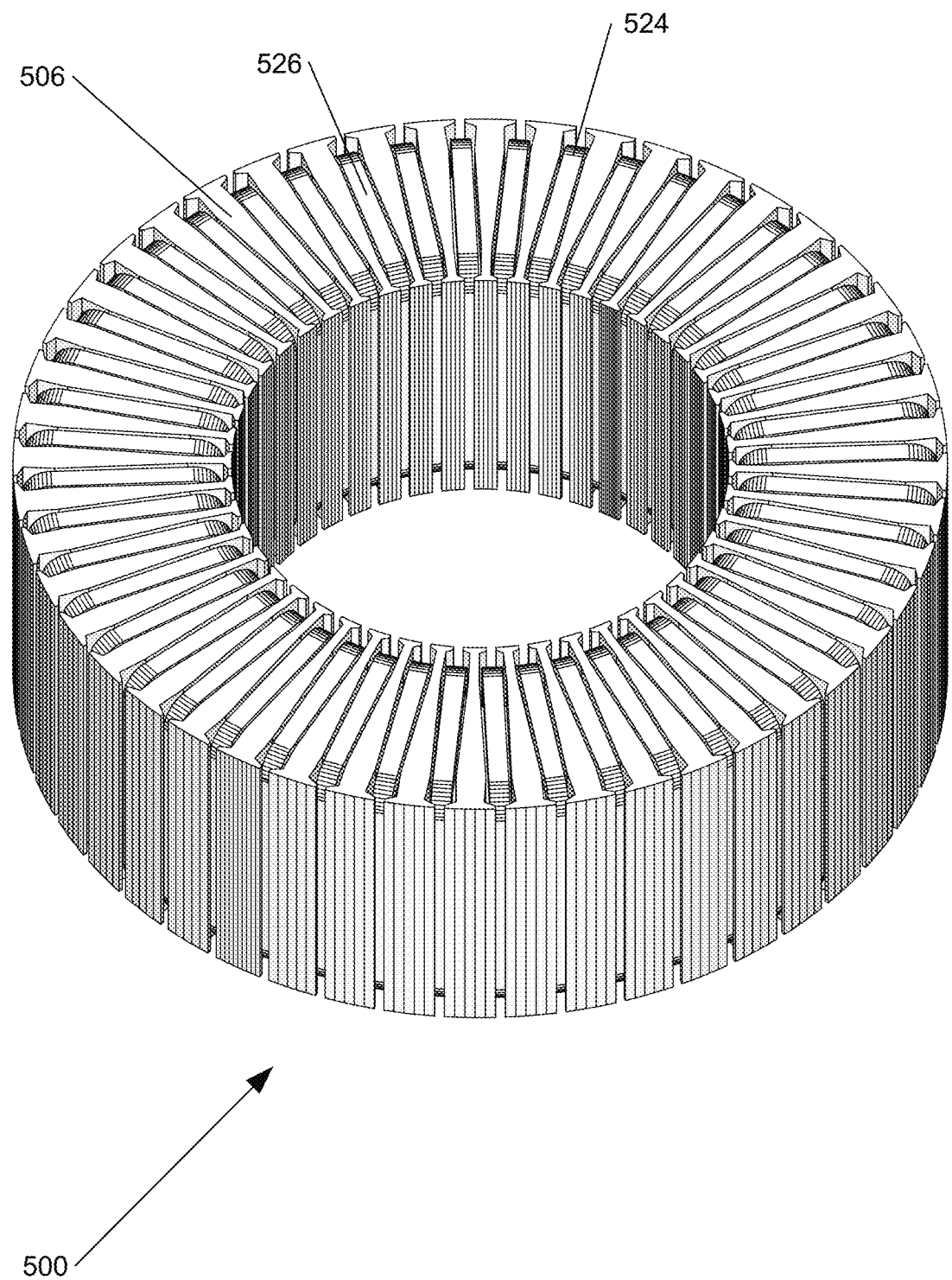
FIG. 4E is an isometric view of the rotor/stator of FIG. 4A coupled to a plurality of coil windings showing a plurality of the rotor/stator teeth.

Adjacent teeth 506 or 506' supported by the core ring 504 form radial slots 524 within the coil assembly support structure 502, as illustrated in FIGS. 4A and 4D. FIG. 4D (which omits a portion of the teeth 506) illustrates a plurality of individual coils or coil windings 526 positioned radially about the ring core 504 and within the slots 524 formed between the adjacent teeth 506 or 506'. In contrast, FIG. 4E illustrates a complete coil assembly 500 showing all of the individual teeth 506 and individual coil windings 526 positioned within the individual slots 524.

Each individual coil 526 in the coil assembly 500 may be made from a conductive material, such as copper (or a similar alloy) wire and may be constructed using conventional winding techniques known in the art. In certain embodiments, concentrated windings may be used. In certain embodiments, the individual coils 526 may be essentially cylindrical or rectangular in shape being wound around the ring core 504 having a center opening sized to allow the individual coil 526 to be secured to the core 504.

By positioning the individual coils 526 within the slots 524 defined by the teeth 506 or 506', the coils are surrounded by a more substantial heat sink capabilities of the teeth which, in certain embodiments, can be can incorporate cooling passages directly into the material forming the teeth. This allows much higher current densities than conventional motor geometries. Additionally, positioning the plurality of coils 526 within the slots 524 and between teeth 506 reduces the air gap between the coils. By reducing the air gap, the coil assembly 500 can contribute to the overall torque produced by the motor or generator. In certain embodiments, the lateral fins 518 and 519 (FIG. 4C), the circumferential fins 520 and 522 (FIG. 4B or 4C) of the teeth 506a or 506'a of the coil assembly reduce the air gap between the structure of the coil to allow flux forces to flow from one fin to an adjacent fin when the coils are energized and the coil assembly 500 begins to move relative to the magnetic tunnel. Thus, all portions of the coil support assembly 502 contribute to the overall torque developed by the system.

The number of individual coils 526 can be any number that will physically fit within the desired volume and of a conductor length and size that produces the desired electrical or mechanical output as known in the art. In yet other embodiments, the coils 526 may be essentially one continuous coil, similar to a Gramme Ring as is known in the art.

FIG. 5A is a perspective view of one embodiment of a toroidal magnetic cylinder 430 forming a circular or ring-like magnetic tunnel positioned about the longitudinal axis 401. As described previously the toroidal magnetic cylinder 430 comprises the top radial ring or side wall magnets 402 (with respect to the longitudinal axis 401). Similarly there is a second or bottom radial ring or side wall magnets 404. An outer cylindrical wall or longitudinal ring of magnets 406 is positioned longitudinally between the first radial wall 402 and the second radial wall of magnets 404. Depending on the embodiment, the outer longitudinal ring of magnets 406 may define an axial slot 410 to accommodate a support structure, a cooling mechanism, and/or wires and conductors. An inner cylindrical wall or longitudinal ring of magnets 408 is also longitudinally positioned between the first radial wall 402 and the second radial wall of magnets 408 and axially positioned within the outer longitudinal ring of magnets 406.

Figure 9A:
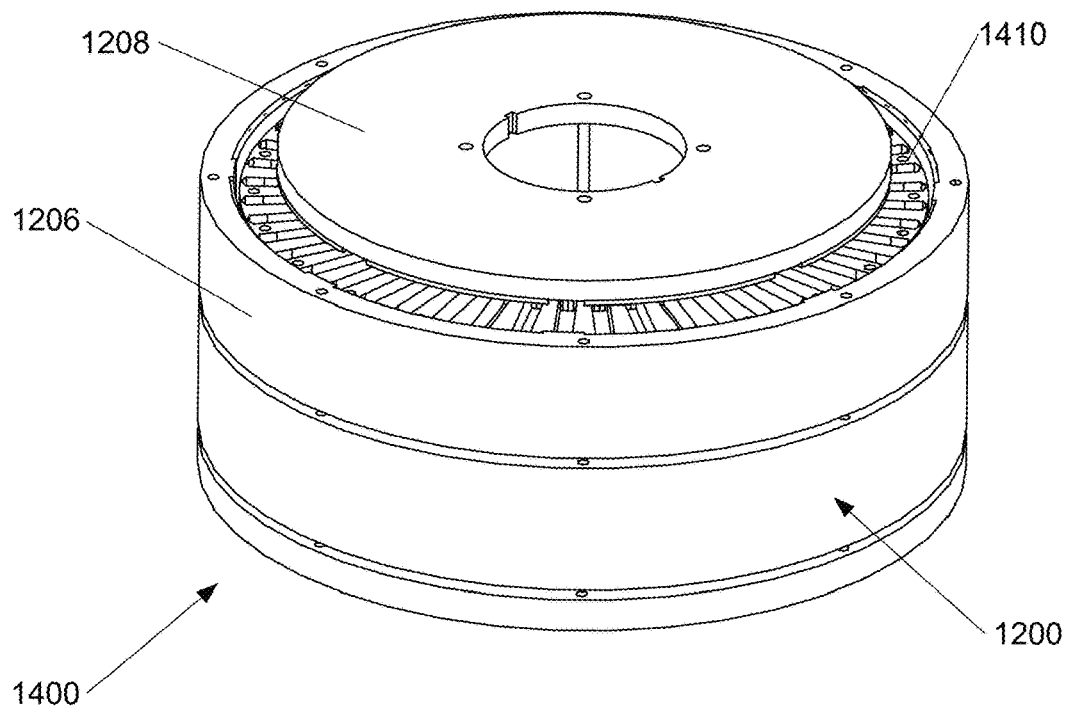
FIG. 9A illustrates an alternative magnetic cylinder coupled to a back iron circuit.

In other embodiments, the inner longitudinal ring of magnets 408 may include an axial slot (similar to slot 4110 illustrated in FIG. 9A). In yet further embodiments, the first radial wall 402 or the second radial wall of magnets 404 may include a side circular slot (not shown). Such slots are designed to accommodate a support structure, a cooling mechanism and/or wires or conductors. One advantage of a slot defined within the inner longitudinal ring or cylindrical wall of magnets 408 (as opposed to the outer longitudinal ring of magnets 406) is that the inner longitudinal wall of magnets 408 produces less torque than the outer ring of magnets 406. Thus, by using the full width of the outer longitudinal ring of magnets 408, greater torque can be produced.

In the embodiment illustrated in FIG. 5A, the toroidal magnetic cylinder 430 comprises eight toroidal magnetic cylinder segments (or magnetic tunnel segments). In other embodiments, there may be two, four, six, ten, twelve segments or more. The number of segments will depend on the particular design and performance characteristics for particular application.

Figure 5B:
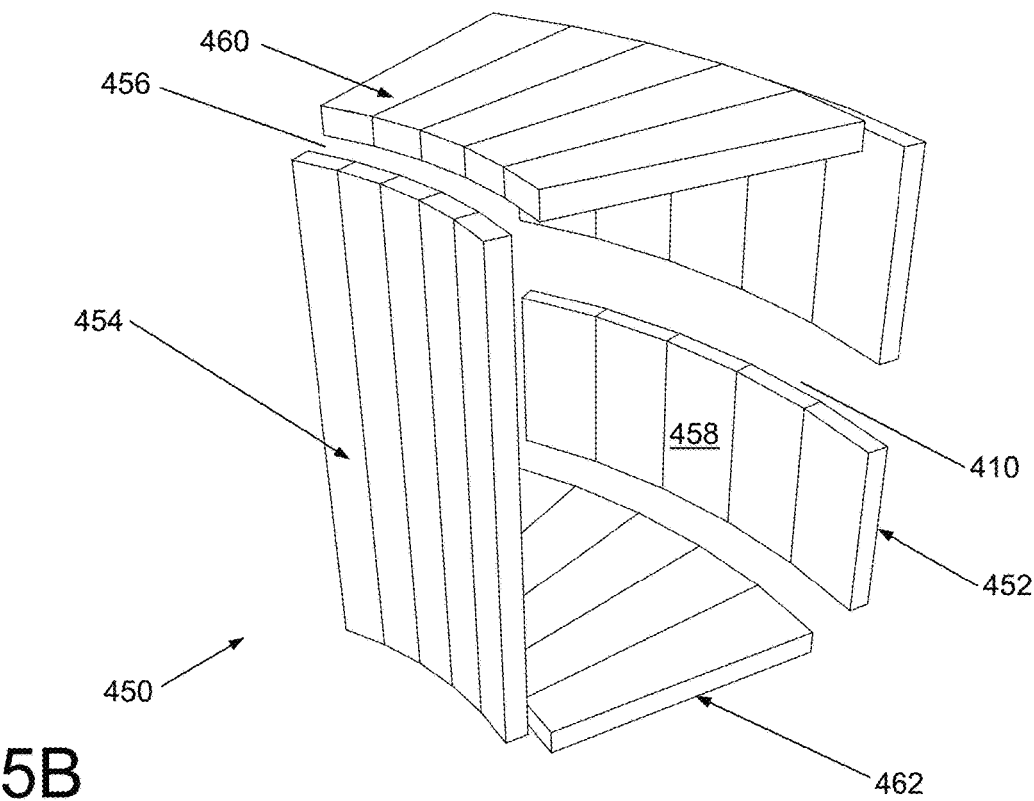
FIG. 5B is a detailed perspective view illustrating one embodiment of a magnetic cylinder segment.
Figure 5C:
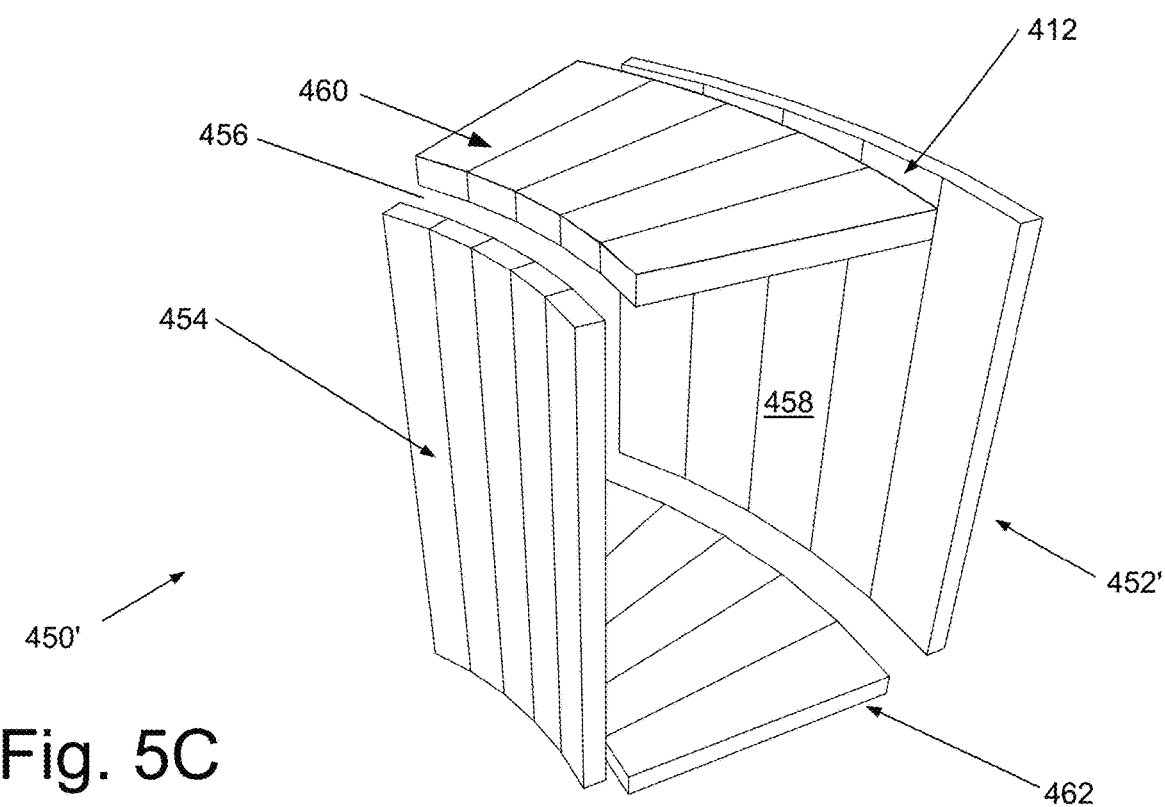
FIG. 5C is a detailed perspective view illustrating an alternative embodiment of a magnetic cylinder segment.

FIG. 5B is a perspective view of a single toroidal magnetic cylinder segment 450 (or a magnetic tunnel segment) which defines an interior section or "magnetic tunnel" 458 or portion of a circular path. FIG. 5C is a perspective view of an alternative embodiment of a single toroidal magnetic cylinder segment 450'. As illustrated, the toroidal magnetic cylinder segments 450 and 450' have outer magnetic walls 452 and 452', respectively (which are portions of the outer cylinder wall 406 discussed above). Both toroidal magnetic cylinder segments 450 and 450' have an inner magnetic wall 454 (which is a portion of the inner magnetic cylinder wall 408 discussed above). In addition to the partial cylindrical magnetic walls 452 (or 452') and 454, there are also be magnetic axial, side or lateral walls 460 and 462 which in these illustrated embodiments may be made of a wedge shape members or magnets. Axial wall 460 may be a portion of the first side or ring wall 402 and axial wall 462 may be a portion of the second side or ring wall 404 or vice versa.

In the illustrated embodiment, there may be small slots between the magnetic walls, such as slot 456 between the wall 454 and the wall 460. As discussed above, in certain embodiments, there may also be slots within the walls, such as slot 410 which is defined within the wall 452 of the embodiment 450. Such a slot 410 may be used to all the passage of a support structure, electrical wires and/or conduits or cooling conduits. The embodiment 450', in contrast, has a slot 412 defined within the axial wall 460.

The individual magnets in the magnetic walls 452 (or 452'), 454, 460, and 462 all have their magnetic poles orientated towards or away from an interior of the tunnel 458 of the toroidal magnetic cylinder segment 450 to form a "closed" magnetic tunnel segment. In other words, the magnetic poles of the magnets forming the outer wall 452 (or outer wall 452) and the inner wall 454 have their magnetic poles orientated to radially point towards the longitudinal axis 401 (FIG. 5A). In contrast, the magnetic poles of the magnets forming the first axial wall 460 and the second axial wall 462 have their magnetic poles orientated parallel with the longitudinal axis 401.

The term "closed magnetic tunnel" as used in this disclosure refers to using a arrangement of the magnets forming the cylinder segment 450 or cylinder segment 450' that that "forces" or "bends" the flux forces from one side of the tunnel to the other in a circumferential direction without letting most of the magnetic flux forces escape in a radial or axial direction (through a slot or other opening). Thus, the slot widths are limited in size to keep flux forces from exiting through the slots. In other embodiments, additional magnets may be inserted into the slots (or in proximity to the slots) to keep most of the flux forces channeled to a predetermined or a circumferential direction.

Figure 5D:
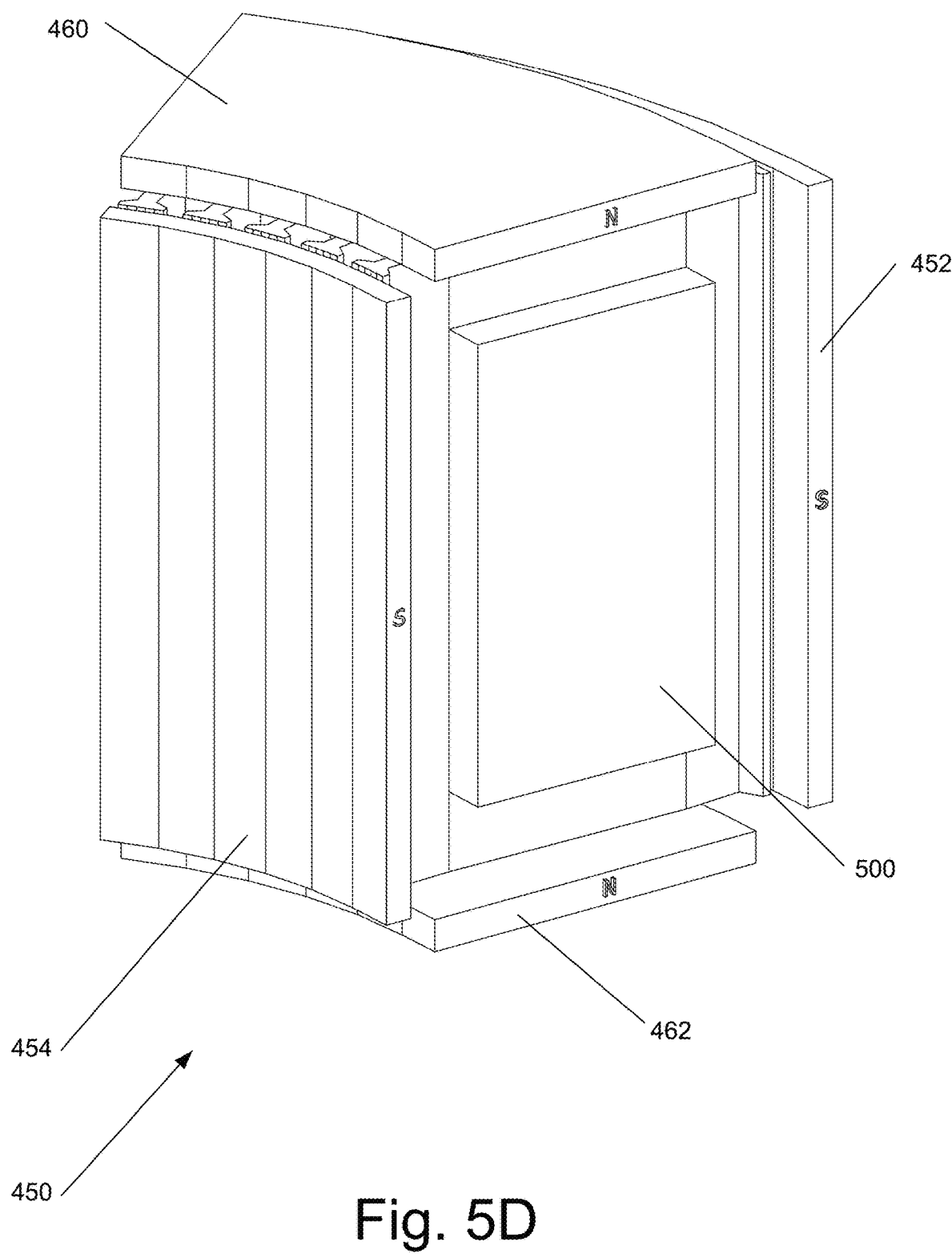
FIG. 5D is a detailed isometric view of one embodiment of a magnetic cylinder segment with a portion of a rotor/stator portion positioned therein illustrating the direction of the magnetic poles of magnets forming the magnetic cylinder segment.

FIG. 5D is an isometric view of the toroidal cylinder segment 450' having a portion of the coil assembly 500 positioned within the interior of the segment. The magnetic orientation or configuration illustrated in FIG. 5C may be called a "NSNS" magnetic pole configuration because two opposing magnet faces have their south poles facing inward and the other two opposing magnetic faces have their north poles facing inward. In other words, the magnets forming the top axial wall 460 and the bottom axial wall 462 have their north magnetic poles facing towards the interior of the tunnel 458. (For a matter of drawing interpretation convenience, an "N" is placed on the edge of the axial wall 460 and axial wall 462 to indicate that their north interior poles are facing inward. Thus, the "N" positioned on the edge or side does not represent an actual magnetic pole, but an indicator of the magnetic polarity for the respective interior face of the appropriate wall.) In contrast, the magnets forming the inner longitudinal wall 454 and the outer longitudinal wall 452' have their south interior magnetic poles facing towards the interior of the tunnel 458 (Thus, an "S" is placed on the edge of the longitudinal wall 454 and longitudinal wall 452 to indicate that their south interior poles are facing inward. Again, the "S" positioned on the edge of the longitudinal wall does not represent an actual magnetic pole.)

In conventional configurations, the opposing poles of the magnets are usually aligned longitudinally. Thus, the magnetic flux lines will "hug" or closely follow the surface of the magnets. So, when using conventional power generating/utilization equipment, the clearances must usually be extremely tight in order to be able to act on these lines of force. By aligning like magnetic poles radially or perpendicular to the coil assembly 500 the magnetic flux forces flow from the surface of the magnets across the coil assembly. This configuration allows for greater tolerances between coils and magnetic surfaces.

One of the advantages of this configuration over conventional motors is that the end turns (in this case the radial section of the coils) are part of the "active section" or force generation section of the motor/generator. In conventional motors, usually only the axial length of the copper conductor is the section that produces power. In conventional motors, the end turns are a penalty, adding weight and losses, but not producing power because the end region fields are not effectively linking the end windings. However, as explained above, the entire coil winding is effectively producing torque due to the side wall or axial magnets which are axially magnetized. Therefore, essentially the entire conductor of the coils is active producing a greater force.

The windings of each coil 526 are generally configured such that they remain transverse or perpendicular to the direction of the relative movement of the magnets comprising the coil assembly 500 and parallel with the longitudinal axis 401. In other words, the coil windings are positioned such that their sides are parallel with the longitudinal axis and their ends are radially perpendicular to the longitudinal axis. The windings are also transverse with respect to the magnetic flux produced by the individual magnets of the rotor at their interior face as described above. Thus, the entire coil winding or windings (including end turns) may be used to generate movement (in motor mode) or voltage (in generator mode).

Figure 6A:
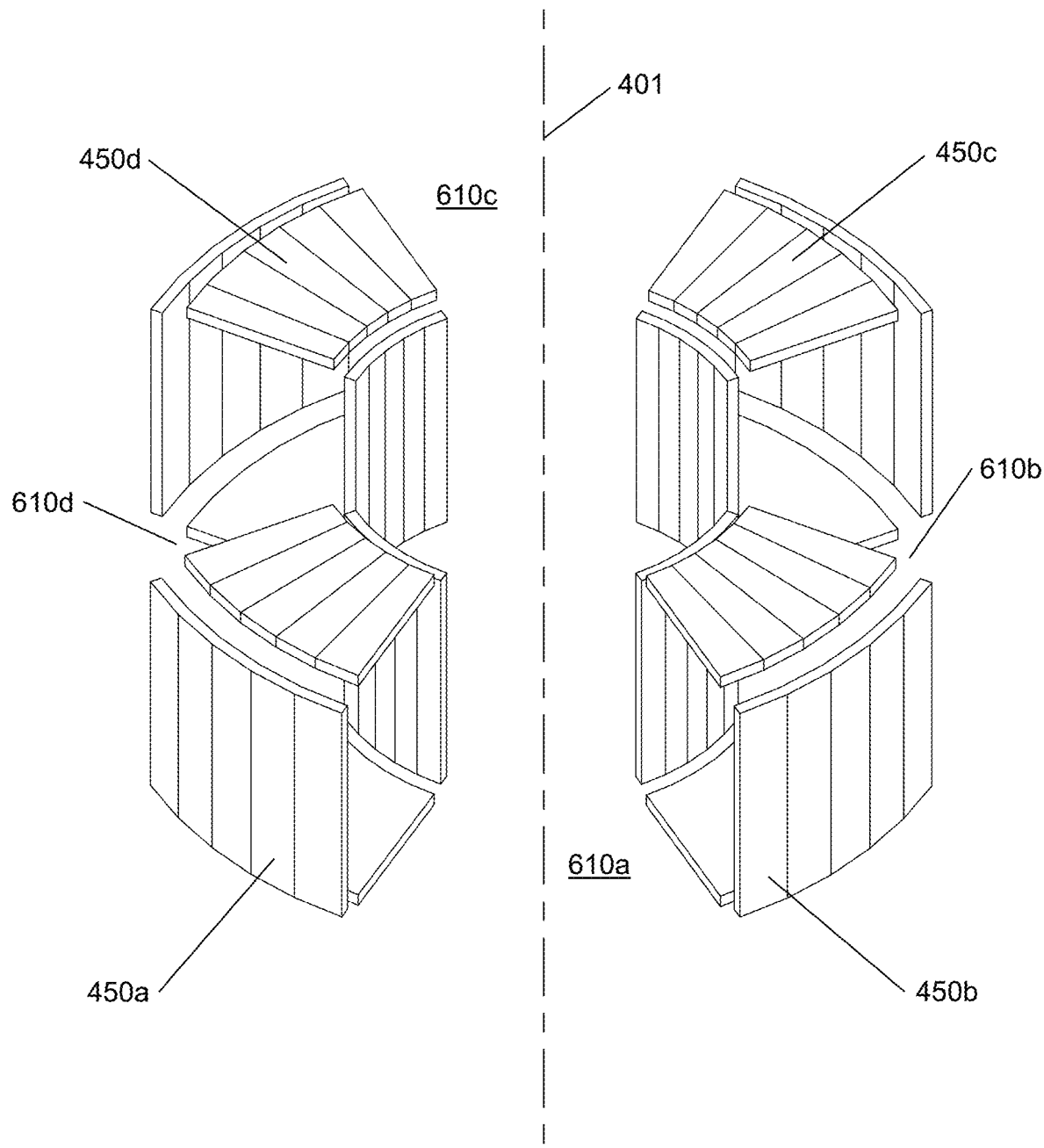
FIG. 6A is a perspective view of four magnetic cylinder segments arranged around a longitudinal axis having similar magnetic pole orientations.

FIG. 6A illustrates four toroidal magnetic cylinder segments 450a, 450b, 450c and 450d arranged circumferentially around a common center or longitudinal axis 401. This arrangement leaves four open spaces 610a, 610b, 610c, and 610d between the respective cylinder segments. Inserting or positioning four additional toroidal magnetic cylinder segments 420a-420d into the spaces 610a-610d results in a complete toroidal magnetic cylinder 430 as illustrated in FIG. 6C. Thus, FIG. 6C illustrates the complete toroidal magnetic cylinder 430 formed from combining the four toroidal magnetic cylinder segments 450a-450d with the toroidal magnetic cylinder segments 420a-420d in an alternating arrangement around the longitudinal axis 401.

The poles of magnets creating the toroidal magnetic cylinder segments 450a-450d are orientated in a specific geometric arrangement to form a NSNS magnetic configuration as discussed above in reference to FIG. 5D. In contrast, the adjacent toroidal magnetic cylinder segments such as the magnetic cylinder segment 420a have their like magnetic poles orientated in the opposite direction as illustrated in FIG. 6B to form a SNSN magnetic configuration.

Figure 6B:
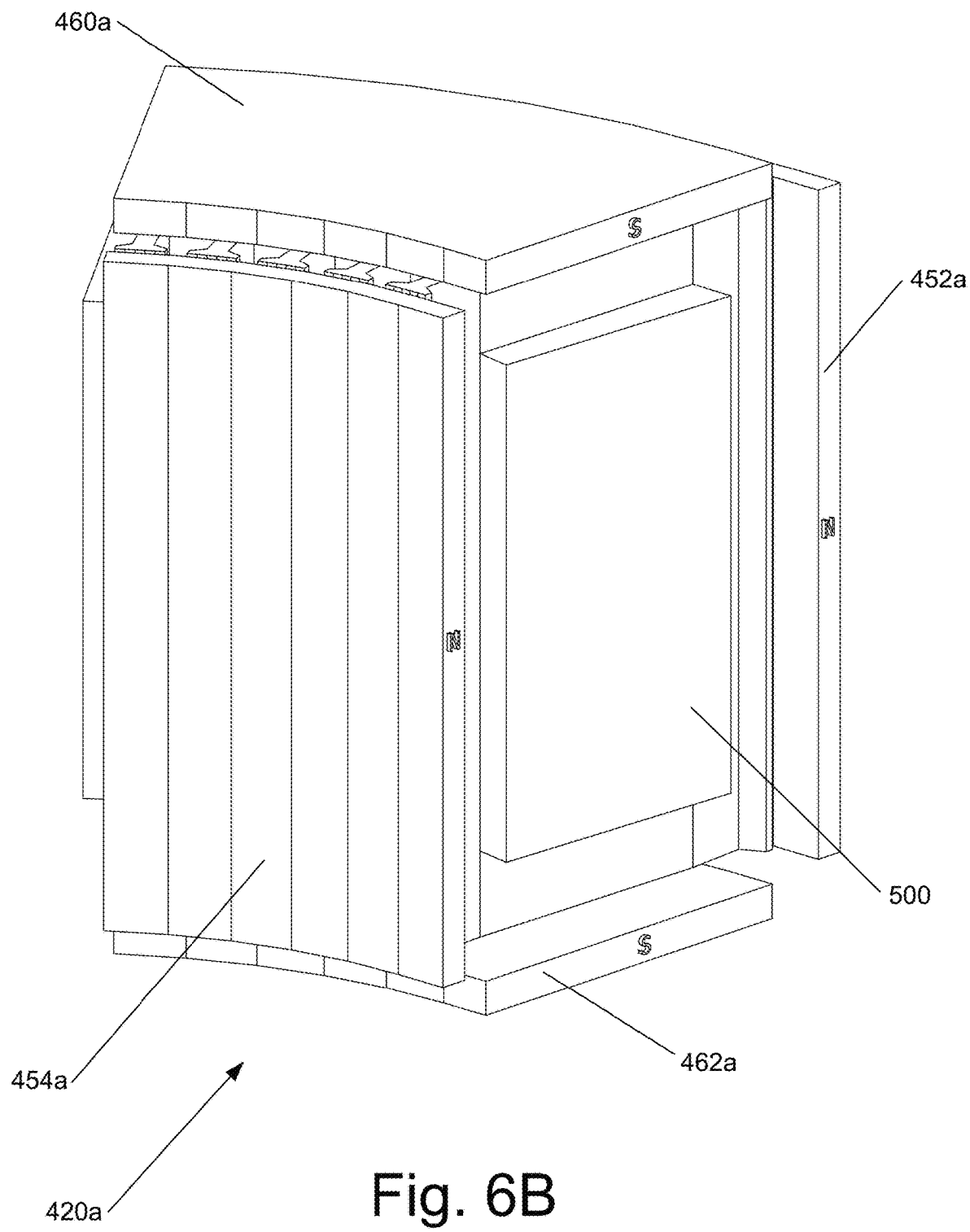
FIG. 6B is a detailed isometric view of one embodiment of a magnetic cylinder segment illustrating the magnets forming the segment have an opposite magnetic polarity to the magnets of the segment illustrated in FIG. 5C.
Figure 6C:
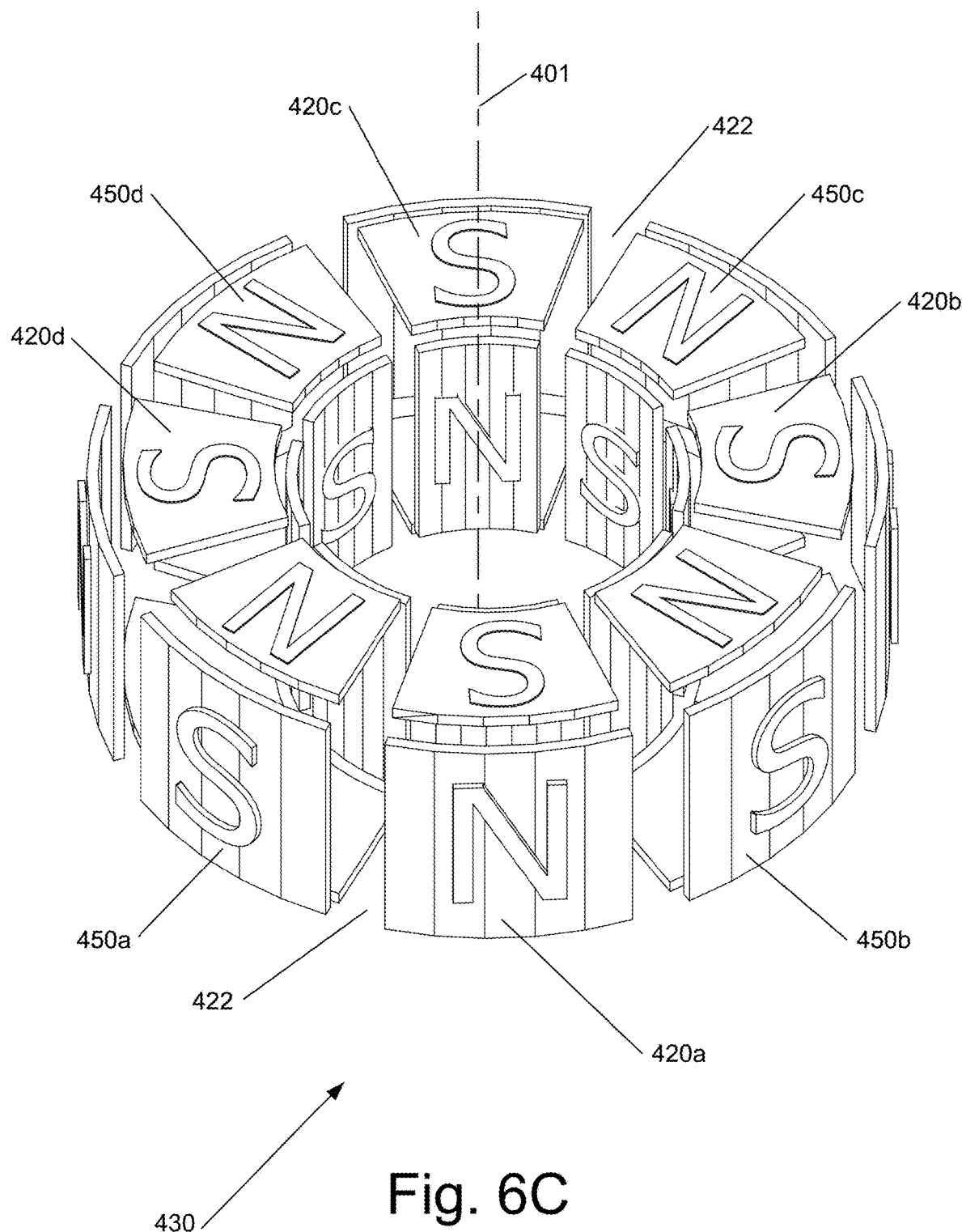
FIG. 6C is an isometric view of the four magnetic cylinder segments with four additional magnetic cylinder segments where the four additional magnetic cylinder segments have a magnetic pole orientation opposite to the first four magnetic cylinder segments.

FIG. 6B illustrates an adjacent toroidal magnetic cylinder segment 420, which could be the toroidal magnetic cylinder segment 420a to 420d. The magnetic cylinder segment 420 is similar to the magnetic cylinder segment 450 discussed above except that the magnetic pole orientation is reversed. In other words, the magnets forming the magnetic walls 460a and 452a have their north poles facing inward towards the interior of the cylinder segment. (As before, "S" is placed on the side of the axial wall 460a and axial wall 462a to indicate that their south poles are facing inward.) The magnets forming the magnetic cylindrical walls 452a and 454a have their north poles facing inward towards the interior of the magnetic cylinder segment. (Similarly, a "N" is placed on the side of the axial wall 462a and longitudinal 454a to indicate that their south poles are facing inward.) Thus, the toroidal magnetic cylinder segments 420a-420d have an opposite magnetic orientation or "configuration" relative to the toroidal magnetic cylinder segments 450a-450d. So, to distinguish this magnetic pole configuration from the NSNS magnetic pole configuration discussed above in reference to FIG. 5D, the magnetic pole configuration illustrated in FIG. 6B is called a SNSN magnetic pole configuration for purposes of this Application.

When the cylinder segments 420a-420d are energized, the current running through the coil windings positioned within the toroidal magnetic cylinder segments 420a-420d runs in an opposite direction than the current running through the coil windings positioned within the magnetic cylinder segments 450a-450d so that the direction of the generated magnetic force or torque is the same throughout the entire magnetic cylinder 430.

In FIG. 6C, some of magnetic walls are labeled with an "S" representing a facing "South" pole of a magnet wall—as opposed to the magnetic walls labeled with an "N" representing a facing "North" pole of the magnetic wall. As before, the letters "N" and "S" are superimposed on the exterior faces of the magnetic walls to indicate the direction and the magnetic pole polarity of the magnets forming the interior of respective wall.

As discussed above, although an eight segment toroidal magnetic cylinder 430 is illustrated in FIG. 6C, in other embodiments, two, three, four, six, ten, etc. partial toroidal magnetic cylinders may be used. The number of partial toroidal magnetic cylinders selected for any given application may be based on engineering design parameters and the particular performance characteristics for an individual application. The scope of this invention specifically includes and contemplates multiple partial toroidal magnetic cylinders having an opposite polarity to the adjacent partial toroidal magnetic cylinders. For simplicity and illustrative purposes, an eight segment toroidal magnetic cylinder is described herein. However, this design choice is in no way meant to limit the choice or number of tunnels for any multi-tunnel toroidal magnetic cylinder.

In certain embodiments, the partial toroidal magnetic cylinders 450a-450d and 420a-420d may be sized to allow radial gaps 422 to form between the partial toroidal magnetic cylinders when the partial toroidal magnetic cylinders are assembled into the complete cylinder 430 as illustrated in FIG. 6B. In other embodiments, there are no radial gaps between the partial toroidal magnetic cylinders.

Figure 7A:
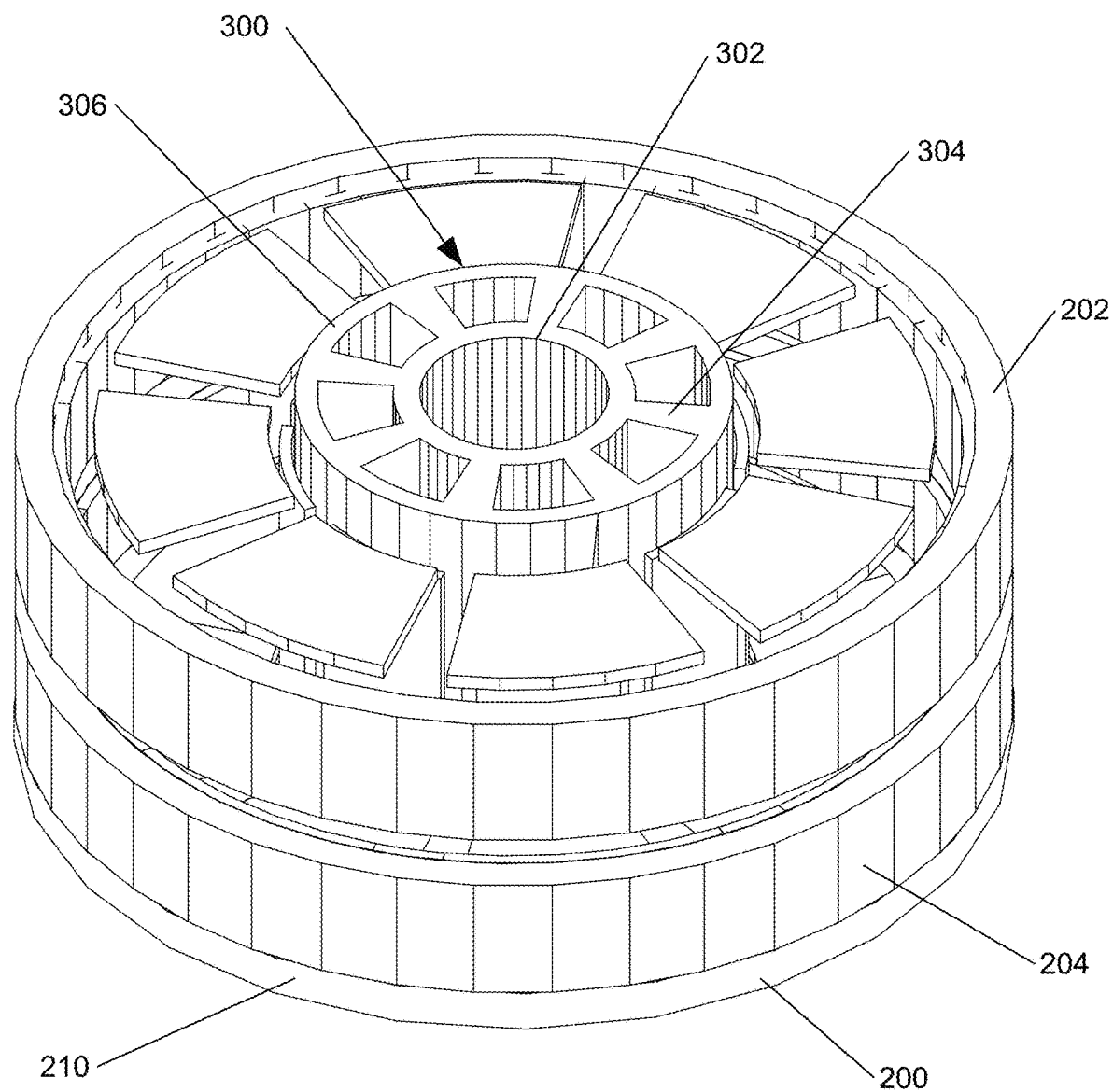
FIG. 7A illustrates the magnetic cylinder of FIG. 6C coupled to a back iron circuit with a portion of the side back iron circuit removed for clarity.
Figure 7B:
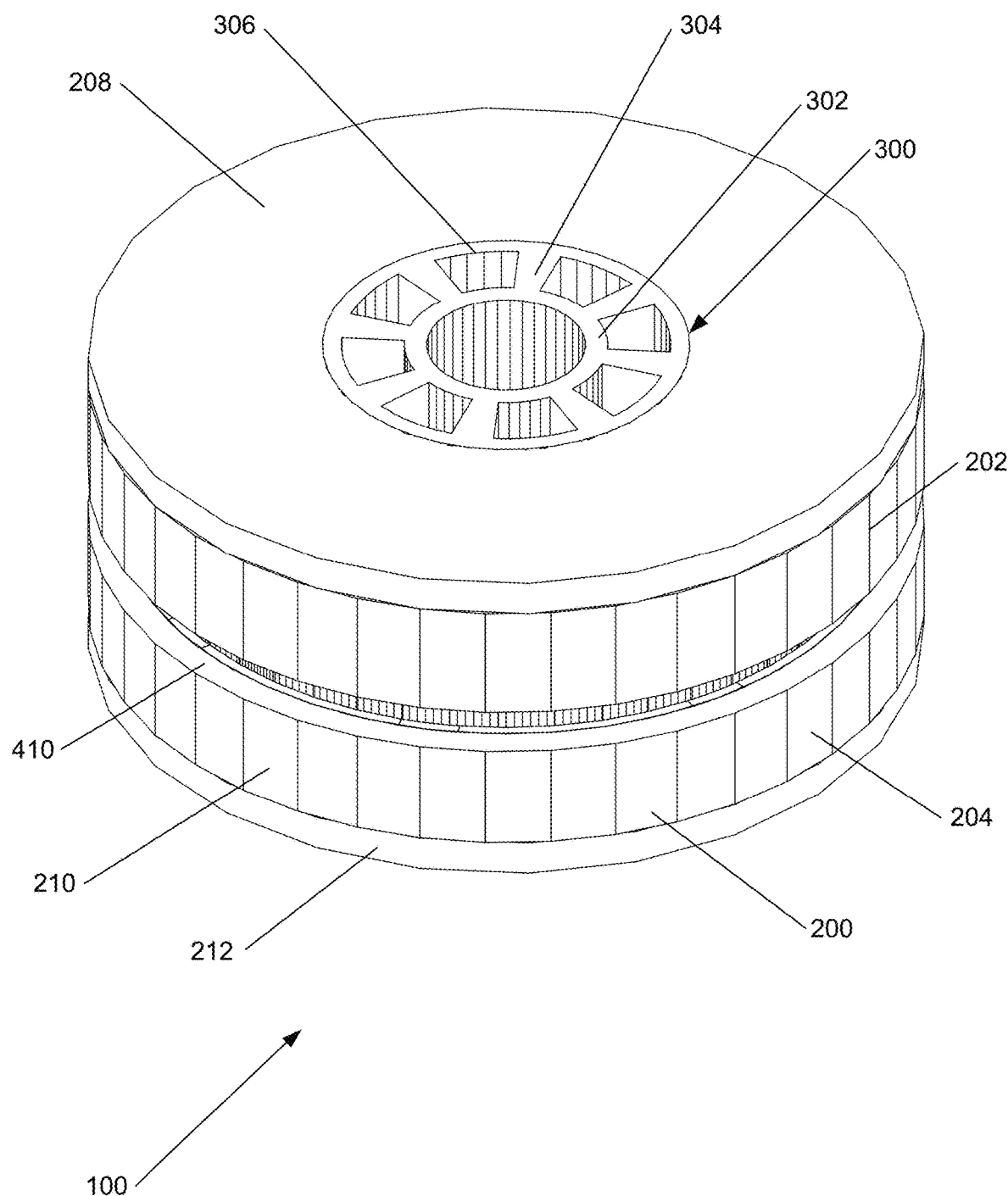
FIG. 7B illustrates the magnetic cylinder of FIG. 6C coupled to a complete back iron circuit.

FIG. 7A illustrates an eight tunnel toroidal magnetic cylinder 430 of FIG. 6C with a portion of the back iron circuit 200 shown enclosing the magnetic cylinder 430. FIG. 7B illustrates the eight tunnel toroidal magnetic cylinder 430 fully enclosed by the back iron circuit 200. As discussed above, in other embodiments, there may be a slot 410 between the back iron components to allow for the passage of control wires and conductors (not shown).

As discussed above, in the illustrative embodiment, the hub 300 comprises an inner hub 302 for coupling to a mechanical load transferring device, such as a shaft or rod (not shown). A plurality of radial arms or spokes 304 structurally connect the inner hub 302 to an outer hub 306. In certain embodiments, the outer hub 306 also comprises a portion of the back iron circuit and thus may be formed from back iron material.

In certain embodiments, the back iron circuit may be used as part of the magnetic flux path. The back iron material channels the magnetic flux produced by the magnetic toroidal cylinder 430 through the back iron material (as opposed to air) to reduce the reluctance of the magnetic circuit. In certain embodiments, therefore, the amount or thickness of the magnets forming the toroidal magnetic cylinder (if permanent magnets are used) may be reduced when using the appropriately designed back iron circuit.

In certain embodiments, the back iron circuit may include a "top" side or axial wall 208 and a "bottom" side or axial wall 210 of back iron material. The back iron circuit may also include the circumferential rings or "walls" 202 and 204 which may or may not couple to the axial walls 208 and 210, respectively. Thus, in this embodiment, the entire back iron circuit includes the outer cylinder wall 306 of the hub 300, the circumferential rings 202 and 204, and the axial walls 208 and 210 as illustrated in FIGS. 7A and 7B. The back iron circuit combined with the toroidal magnetic cylinder 430 may form a rotor (or a stator depending on the motor/generator configuration). If the toroidal magnetic cylinder 430 is used as a rotor, the toroidal magnetic cylinder may comprise four sub-rotors where each magnetic wall of the tunnel is considered a rotor. For instance, referring back to FIG. 5D, the magnetic wall 460 may be a first rotor or "sub-rotor", the magnetic wall 462 may be a second rotor or "sub-rotor", the magnetic wall 452 may be third rotor or "sub-rotor", and the magnetic wall 454 may be a fourth rotor or "sub-rotor."

In order maintain the generated torque and/or power the individual coils 526 in the coil assembly may be selectively energized or activated by way of a switching or controller (not shown). The individual coils 526 in the coil assembly 500 may be electrically, physically, and communicatively coupled to switching or controller which selectively and operatively provides electrical current to the individual coils in a conventional manner.

For instance, the controller may cause current to flow within the individual coil when the individual coil is within a magnetic tunnel segment with a NSNS magnetic pole configuration as illustrated in FIG. 5D. On the other hand when the same individual coil moves into an adjacent magnetic tunnel segment with a SNSN magnetic pole configuration, the controller causes the current within the individual coil to flow in a direction opposite to that shown in FIG. 5D so that the generated magnetic force is in the same direction.

Turning back to FIG. 4D, the individual coils 526 may use toroidal winding without end windings and in some embodiments be connected to each other in series. In other embodiments, a three phase winding may be used where adjacent coils are connected together to form a branch of each phase. For instance, two adjacent coils may be phase A coils, the next two adjacent coils may be phase B coils, and the next two adjacent coils may be phase C coils. This three phase configuration would then repeat for all individual coils 526 within the coil assembly. In one embodiment, there are eight (8) pairs of adjacent phase A coils for a total of 16 phase A coils. Similarly, there are eight (8) pairs of adjacent phase B coils for a total of 16 phase B coils, and there are eight (8) pairs of adjacent phase C coils for a total of 16 phase C coils. Thus, in such an embodiment, there are 48 individual coils.

When the coils are energized, the three phase winding can produce a rotating magnetic field in the air gap around the coil assembly. The rotating magnetic field interacts with the magnetic field generated by the toroidal magnetic tunnel producing torque and relative movement between the coil assembly and the toroidal magnetic tunnel.

In such embodiments, the individual coils 526 may be connected to a brushless motor controller (not shown) to be activated in a manner known in the art. For each phase, the controller can apply forward current, reverse current, or no current. In operation, the controller applies current to the phases in a sequence that continuously imparts torque to turn the magnetic toroidal tunnel in a desired direction (relative to the coil assembly) in motor mode. In certain embodiments, the controller can decode the rotor position from signals from position sensors or can infer the rotor position based on current drawn by each phase.

Figure 8:
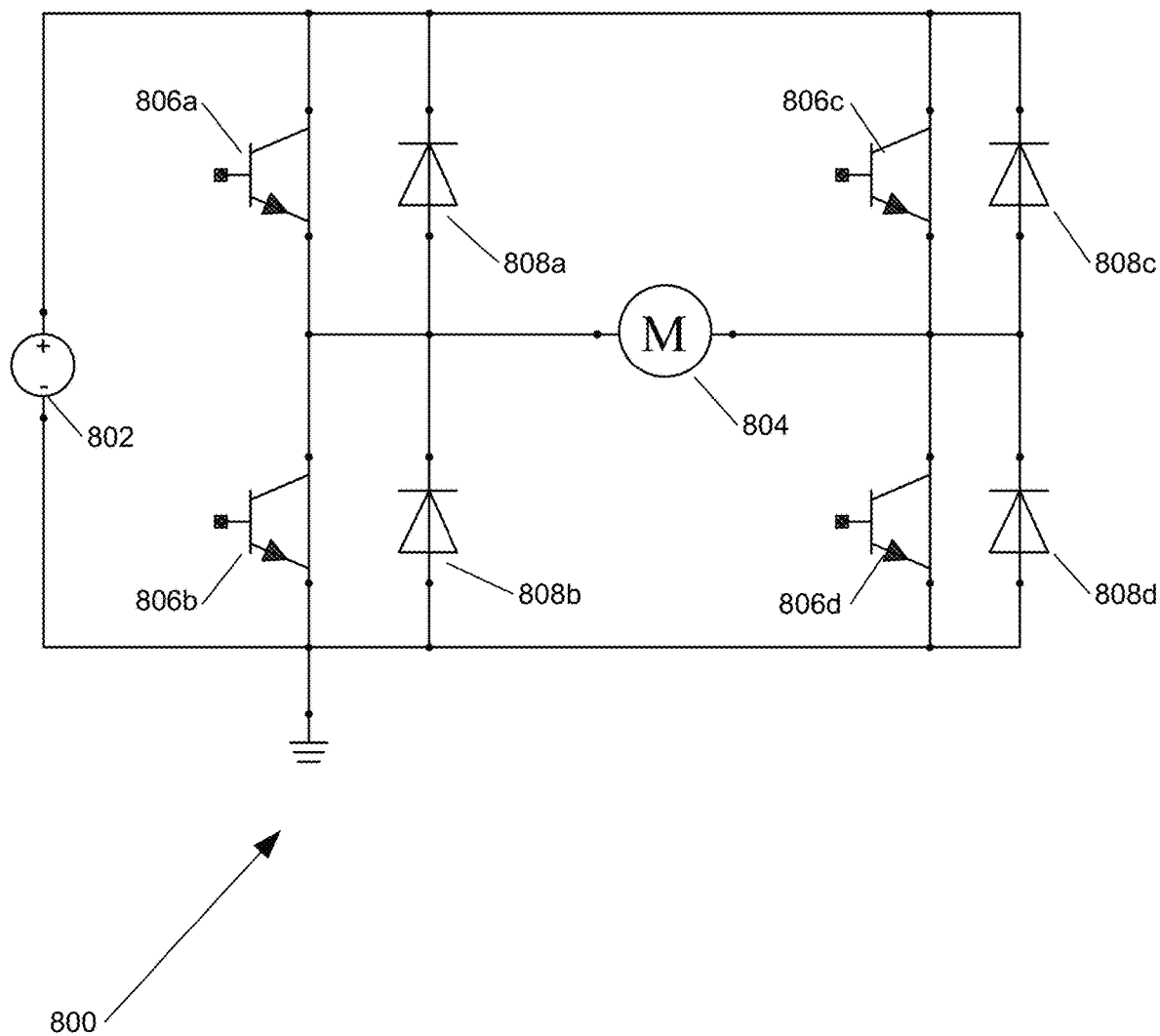
FIG. 8 illustrates an exemplary switch circuit which may be used with certain embodiments of the present invention.

In yet other embodiments, a brushed motor/generator may be used. In such embodiments, one or more commutators (not shown) may be used and positioned, for instance, within the hub 300. In certain embodiments, the number of brushes used may equal the number of toroidal magnetic segments used in the design of the particular motor/generator. For instance, if four toroidal magnetic segments are used, then four brushes may be used. The individual coils 526 in the coil assembly may be connected in series having toroidal wound windings. In a brushless design in motor mode, a simplified switching circuit 800 such as illustrated in FIG. 8 is all that is necessary to switch the current direction as the coils enter and exit the respective toroidal magnetic segment. As illustrated in FIG. 8, a power source 802 is electrically coupled to a brushless motor 804 via four pairs of transistors 806*a*-806*d* and diodes 808*a*-808*d* as is known in the art to switch the current of the four toroidal magnetic segments.

A Motor/Generator Embodiment

FIG. 9A illustrates a magnetic disc assembly 1400 (similar to the magnetic disc assembly 400 of FIGS. 1 and 2) enclosed by a back iron circuit 1200. The back iron circuit 1200 is similar to the back iron circuit 200 discussed above. As opposed to the embodiment discussed above in reference to FIGS. 7A and 7B which has a circumferential slot 410 defined in between the first cylindrical wall 206 and the second cylindrical wall 210 of the back iron circuit 200, the toroidal magnetic cylinder 1400 has a side slot 1410 defined between a first side or top wall 1208 and a first cylindrical wall 1206 of the back iron circuit 1200. The side slot 1410 may be used to allow for a structural side support (e.g., an extension ring) in addition to the passage of control wires and conductors. For brevity and clarity, a description of those parts and components which are identical or similar to those described in connection with the embodiment illustrated in the above figures will not be repeated here. Reference should be made to the foregoing paragraphs with the following description to arrive at a complete understanding of alternative embodiments.

Figure 9B:
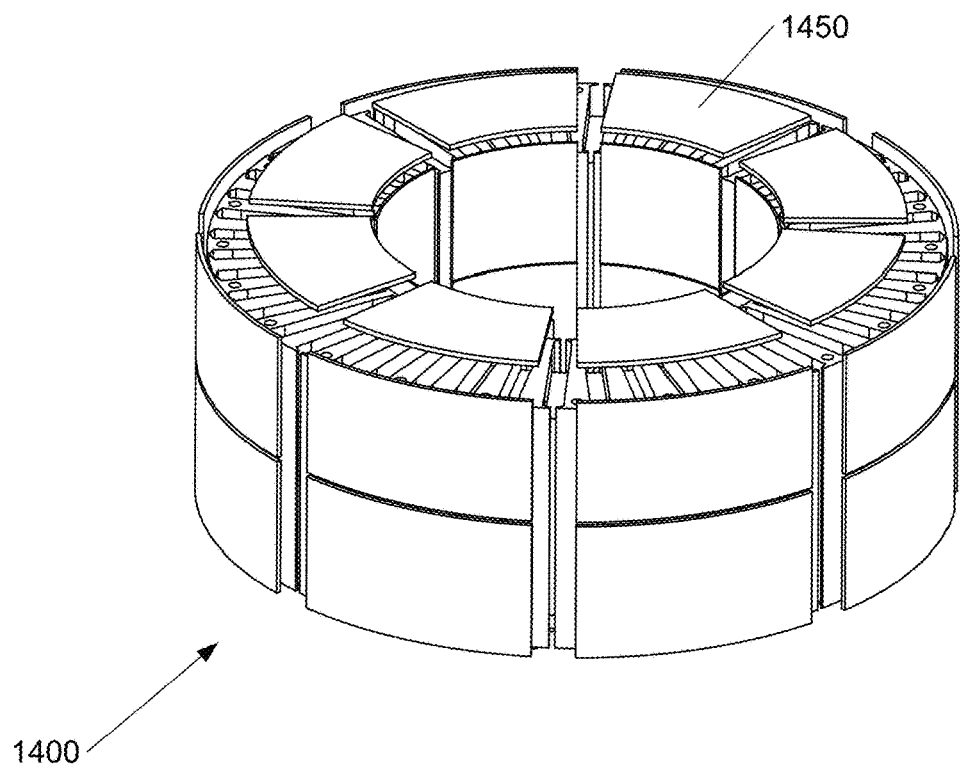
FIG. 9B is an assembled view of the alternative magnetic cylinder.

FIG. 9B illustrates the magnetic disc assembly 1400 with the back iron circuit 1200 removed for clarity. Although eight magnetic tunnel segments 1450 are illustrated in FIG. 9B, the toroidal magnetic cylinder 1400 may be made of any number of magnetic tunnel segments—as explained above in reference to the toroidal magnetic cylinder 430.

Figure 9C:
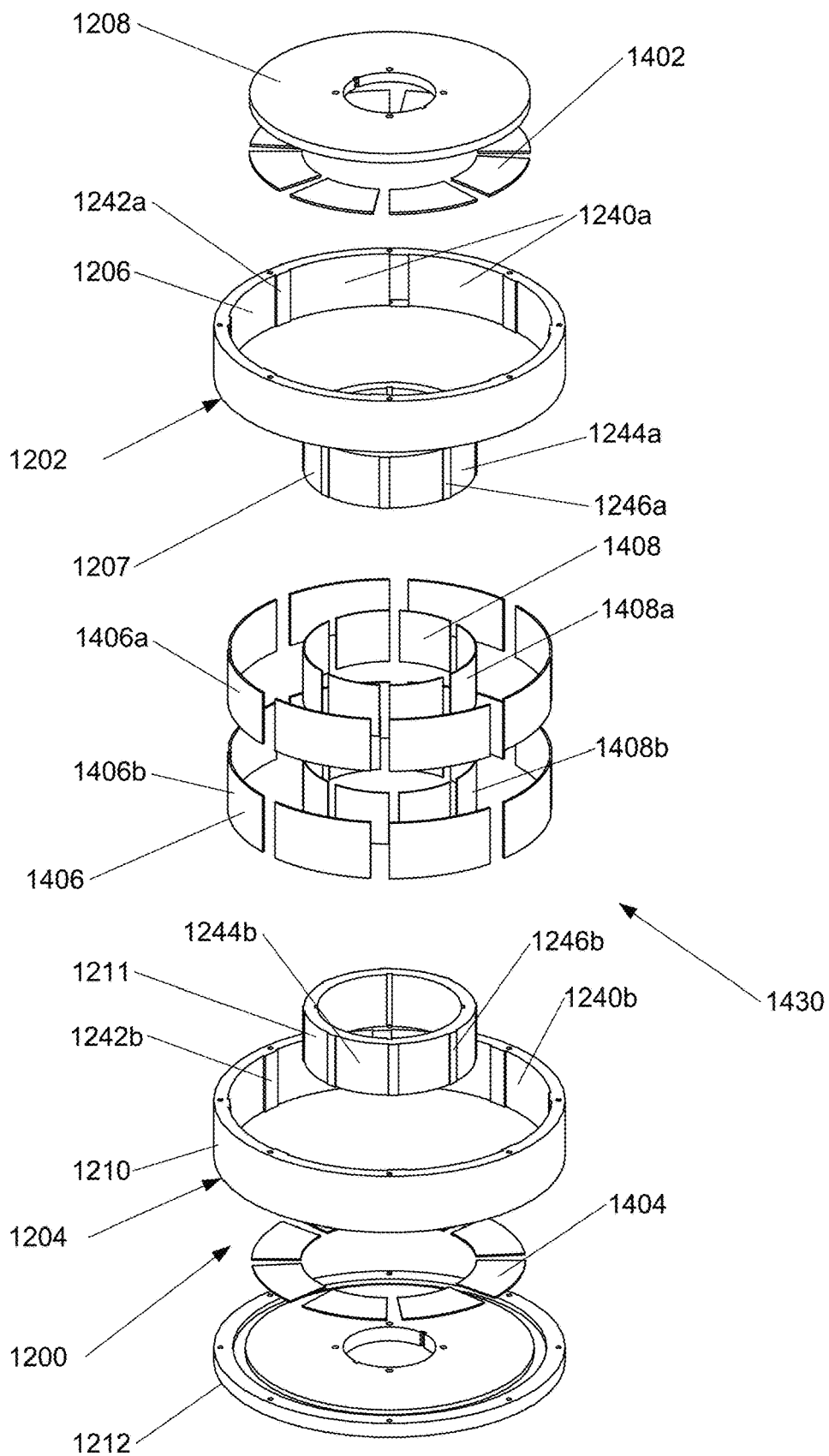
FIG. 9C is an exploded view of the alternative magnetic cylinder of FIG. 9B.

FIG. 9C is an exploded isometric view of the back iron circuit 1200 and the magnets forming a toroidal magnetic cylinder 1430 (which is similar to the toroidal magnetic cylinder 430 discussed above). In this embodiment, the back iron circuit 1200 comprises a first portion 1202 and a second portion 1204. The first portion of the back iron circuit 1200 comprises the side or top wall 1208, a first circumferential outer wall or ring 1206, and a first interior wall or ring 1207. The second portion 1204 of the back iron circuit 1200 comprises the side or bottom wall 1212, the second circumferential outer wall or ring 1210, and a second interior wall or ring 1211.

The toroidal magnetic cylinder 1430 is formed by a first radial wall or side wall 1402, a second axial or opposing ring or side wall 1404, an outer cylindrical wall or longitudinal ring of magnets 1406, an inner cylindrical wall or longitudinal ring of magnets 1408. When assembled, the outer cylindrical wall 1406 and the inner cylindrical wall 1408 are longitudinally positioned between the first radial wall 1402 and the second radial wall of magnets 1404. Additionally, the inner cylindrical wall 1408 is laterally positioned within the outer longitudinal ring of magnets 1406. In the illustrated embodiment of FIG. 9C, the outer cylindrical wall 1406 is composed of two portions or "rings"—a first outer ring 1406a and a second outer ring 1406b. Similarly, the inner cylindrical wall 1408 may comprise two portions or inner rings: a first ring 1408a and a second ring 1408b.

As discussed in previous embodiments, each outer ring 1406a and 1406b may comprise a plurality of curved magnets. In this embodiment, a plurality of inner longitudinal grooves 1240a are defined and radially spaced around an inner surface 1242a of the first outer cylinder wall 1206 of the back iron circuit 1200. The plurality of outer magnets forming the first portion 1406a of the outer magnetic wall 1406 are sized to fit within the plurality of inner longitudinal grooves 1240a. Similarly, a plurality of inner longitudinal grooves 1240b are defined and radially spaced around an inner surface 1242b of the second outer cylinder wall 1210. The plurality of outer magnets forming the second portion 1406b of the outer magnetic wall 1406 are sized to fit within the plurality of inner longitudinal grooves 1240b.

Each inner magnetic ring or wall portion 1408a and 1408b also comprises a plurality of curved magnets. A plurality of outer longitudinal grooves 1244a are defined and radially spaced around an outer surface 1246a of the first inner cylinder wall 1207 of the back iron circuit 1200. The plurality of inner magnets forming the first portion 1408a of the inner magnetic wall 1408 are sized to fit within the plurality of outer longitudinal grooves 1244a. Similarly, a plurality of outer longitudinal grooves 1244b are defined and radially spaced around an outer surface 1246b of the second inner cylinder wall 1211. The plurality of inner magnets forming the second portion 1408b of the inner magnetic wall 1408 are sized to fit within the plurality of outer longitudinal grooves 1244b.

Thus, the plurality of grooves 1240a, 1240b, 1244a and 1244b are designed to position and structurally support the plurality of magnets forming the outer cylindrical magnetic wall 1406 and the inner cylindrical magnetic wall 1408.

Figure 10A:
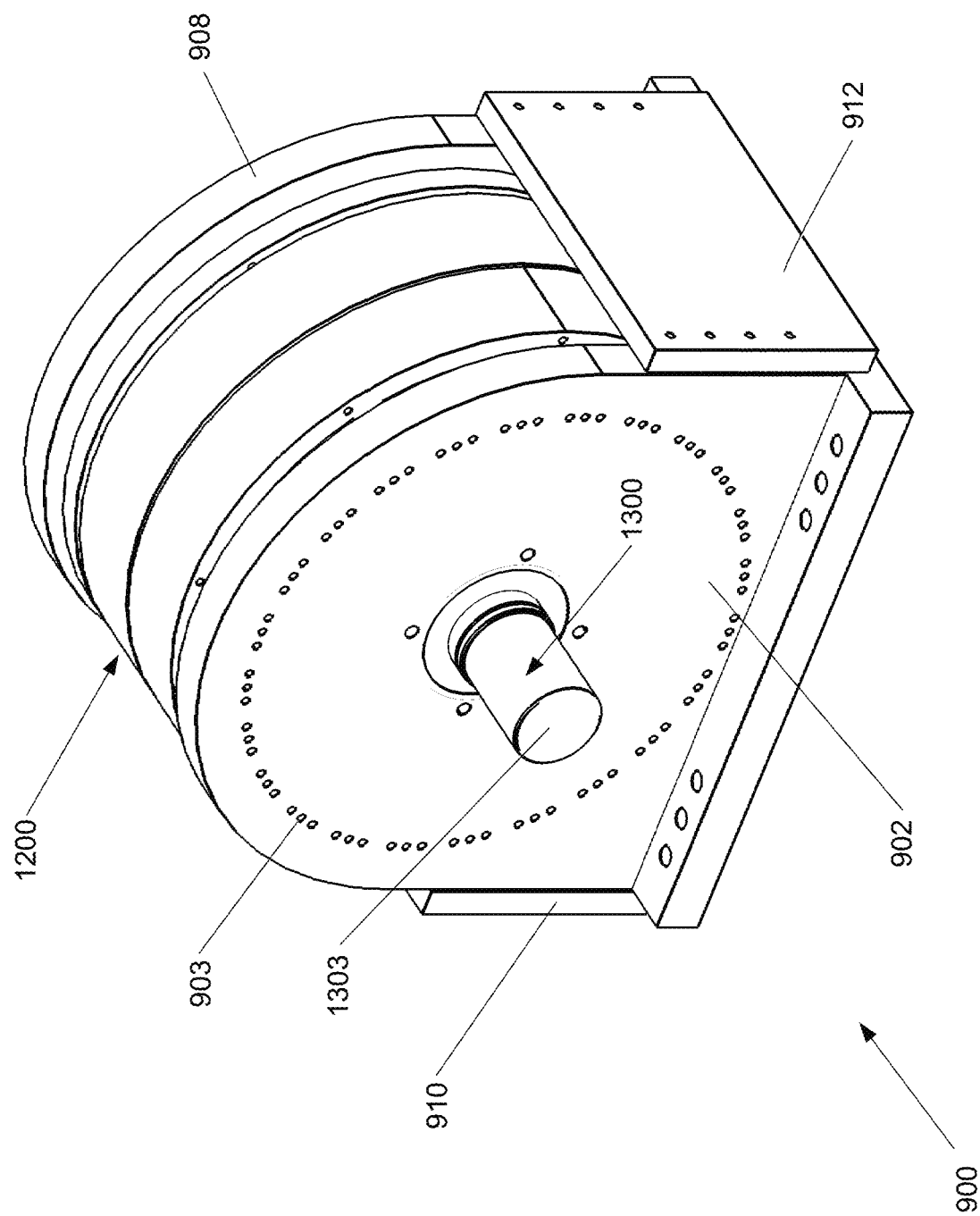
FIG. 10A is an assembled view of a motor/generator incorporating the alternative magnetic cylinder.
Figure 10B:
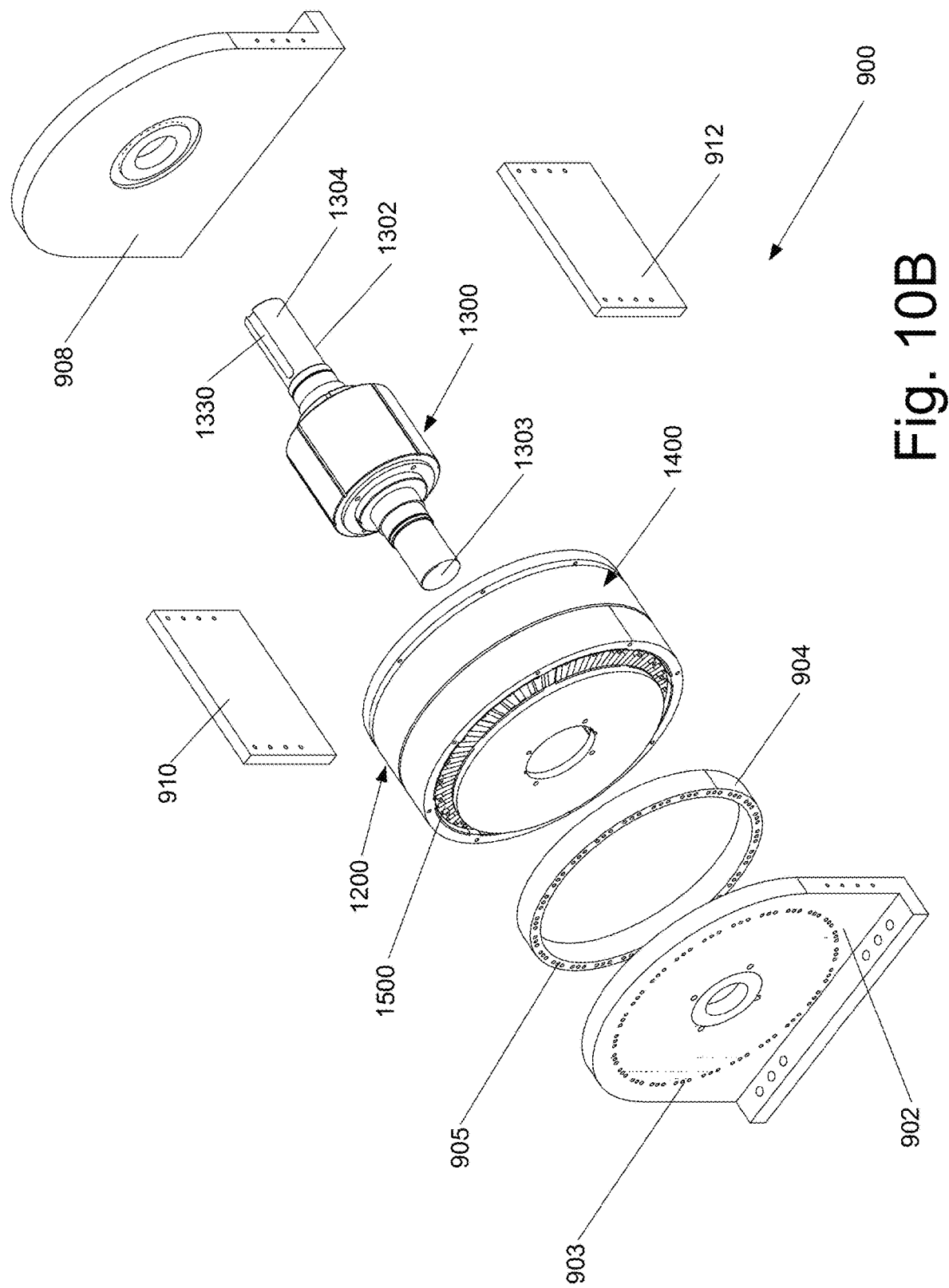
FIG. 10B is an exploded view of a motor/generator incorporating the alternative magnetic cylinder.

FIG. 10A is an isometric assembled view of a system 900 using the magnetic disc assembly 1400 (not visible) and back iron circuit 1200 (FIGS. 9A to 9C). In contrast, FIG. 10B is an exploded isometric view of the system 900. Referring now to both FIGS. 10A and 10B, the magnetic disc assembly 1400 is used as a component in the system 900. The magnetic disc assembly 1400 includes a coil assembly 1500 (which is similar to the coil assembly 500 discussed above). Depending on the configuration, the system 900 can be either an electric motor or an electric generator.

In certain embodiments, the system 900 includes a stator side end plate 902 and an extension or support ring 904 which fixedly couples the coil assembly 1500 to the stator side end plate 902. The stator side end plate 902 includes a series of apertures 903 arranged in a circular configuration. Similarly, the support ring 904 also has a series of apertures 905 defined in a circular configuration which are sized and spaced to align the apertures 903 of the stator side end plate 902 when the system 900 is assembled. Screws, bolts or other fasteners may extend through some of the apertures 903 and 905 to secure the stator side end plate 902 to the coil assembly 1500.

When assembled, an end 1303 of a rotor shaft 1302 extends through the stator side end plate 902 as illustrated in FIG. 10A. A rotor hub 1300 couples to the rotor shaft 1302 and supports the back iron circuit 1200, which in turn supports the toroidal magnetic cylinder 430 (not visible in FIGS. 10A and 10B). The opposing end 1304 of the rotor shaft 1302 is supported by a rotor side end plate 908. When assembled, in this embodiment, a pair of side plates 910 and 912 couple the stator side end plate 902 to the rotor side end plate 908 as illustrated in FIG. 10A. In yet, other embodiments, a casing can be used to secure the endplates together or the endplates may be integrated into a casing. In yet other embodiments, the back iron circuit may form a casing. As is known in the art, the rotor shaft 1302 is a mechanical load transferring device that either inputs a mechanical rotation force into the system when in generator mode or produces a mechanical rotational force when the system is in motor mode.

Figure 10C:
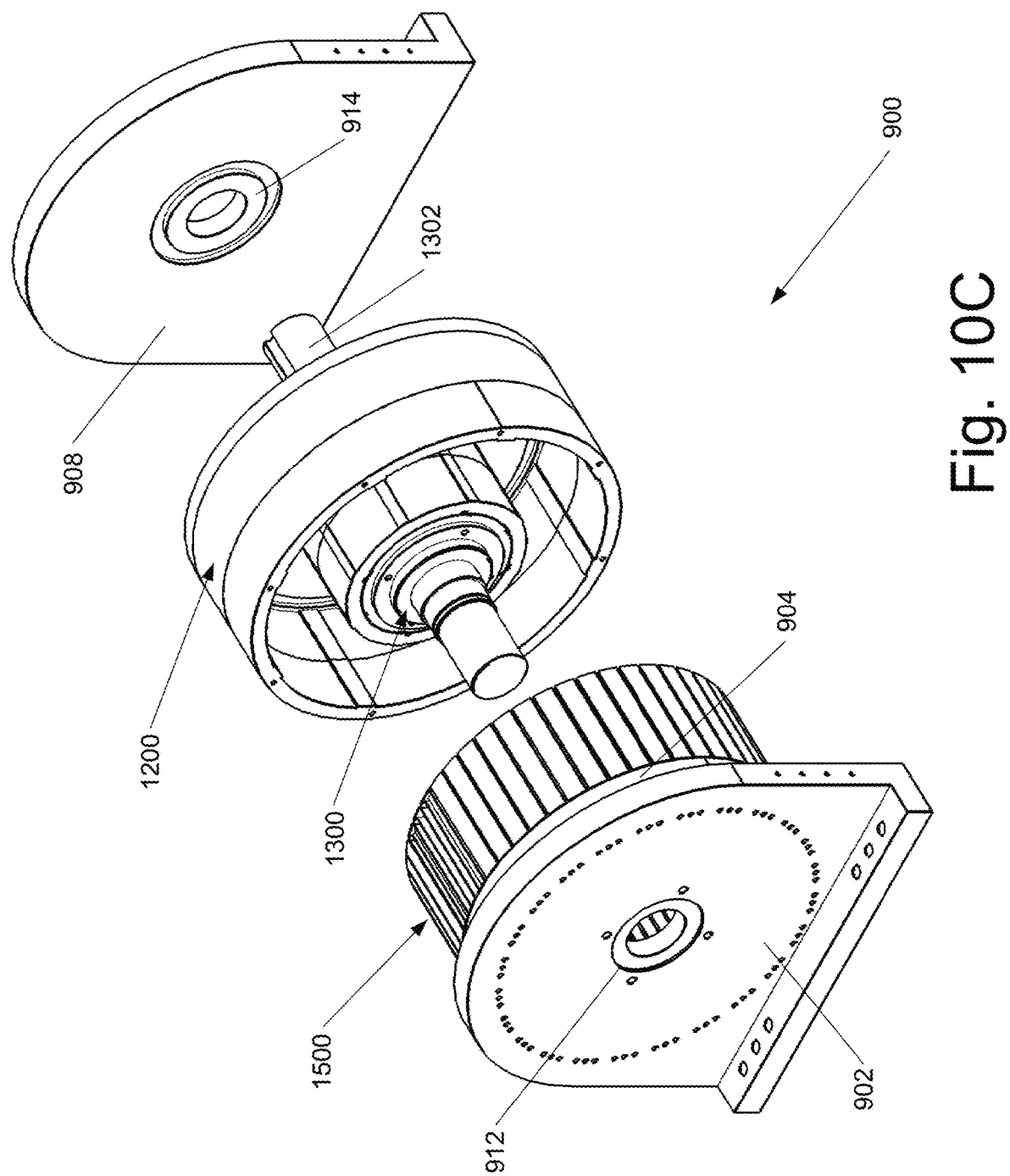
FIG. 10C is an exploded view of a partially assembled motor/generator incorporating the alternative magnetic cylinder.

FIG. 10C is another exploded illustration of the system 900 where the stator or coil assembly 1500 is illustrated coupled to and supported by the stator end plate 902 via the extension ring 904. Thus, the end plates 902 and 908, the extension ring 904, and the coil assembly 1500 (the stator) are stationary in this configuration. In contrast, the rotor hub 1300 is fixedly coupled to the back iron circuit 1200 which supports and positions the toroidal magnetic cylinder 1430 (not shown in FIG. 10C). The rotor shaft 1302 may be structurally supported by the stator end plate 902 and the rotor end plate 904. Bearing units 912 and 914 are positioned between the ends of the rotor shaft 1302 and the end plates to allow the rotor shaft to rotate with respect to the end plates. Thus, as illustrated in FIG. 10C, the coil assembly 1500 (or stator) is fixedly coupled to the end plate 902. In contrast, the toroidal magnetic disc 1430 and the back iron circuit 1200 (or rotor) is rotatably coupled to the end plate 908. The endplates 902 and 908 secure the entire arrangement of the machine and will ensure the integrity of the rotating components.

In certain embodiments, wires and cooling medium may enter the coil assembly 500 from the dedicated end plate 902 via the extension ring 904 via the apertures 903 and 905, respectively. In contrast, the rotating components (the toroidal magnetic disc 1430 and the back iron circuit 1200) may be coupled together and will be coupled in tandem with the rotor hub 1300, which in turn is fixedly coupled to the shaft 1302.

Figure 10D:
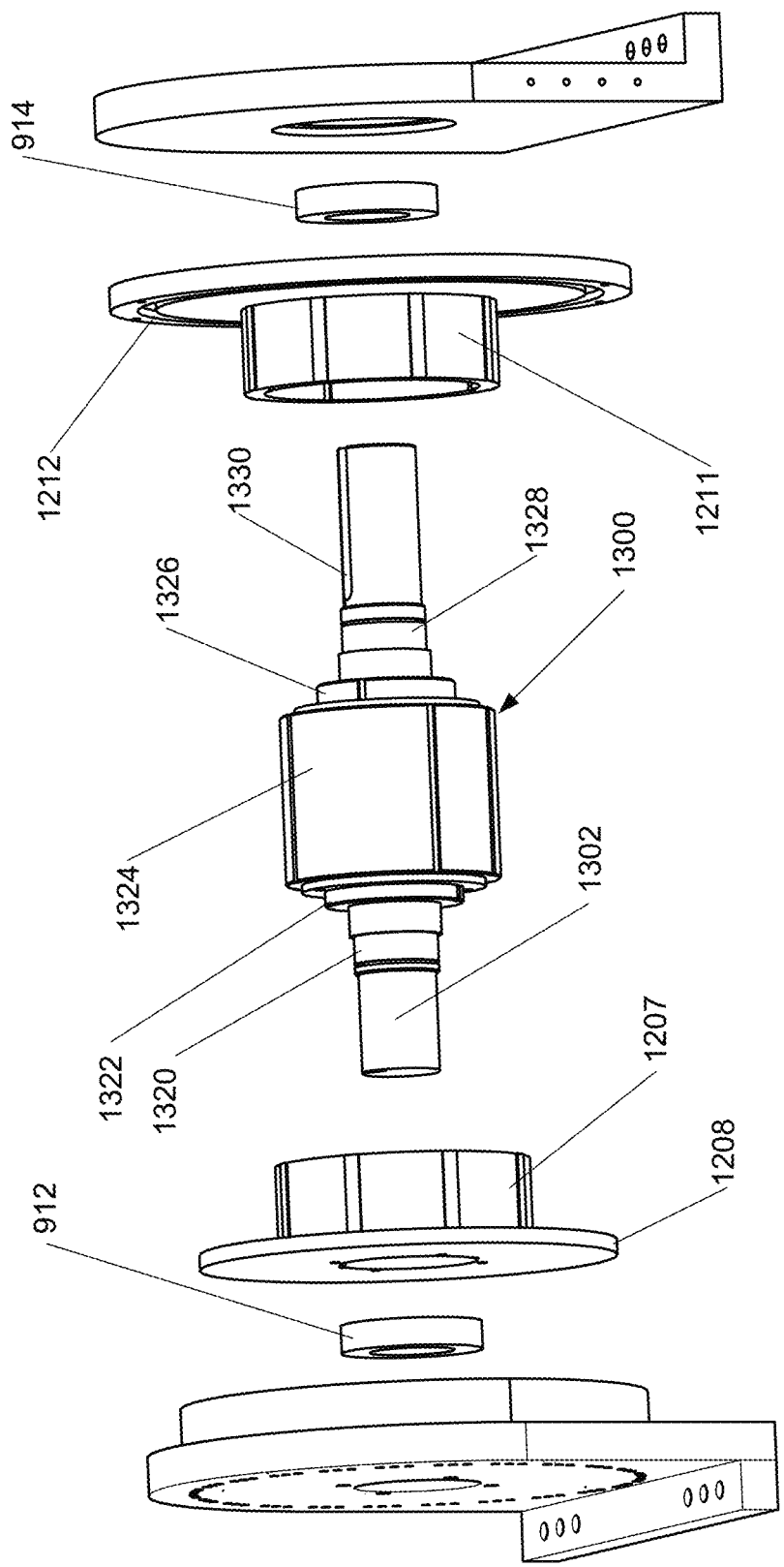
FIG. 10D is an exploded view of a motor/generator incorporating the alternative magnetic cylinder with certain components removed for clarity.

FIG. 10D is a partial exploded view illustrating certain details regarding the rotor hub 1300. The coil assembly 1500 and the outer walls 1206 and 1210 of the back iron circuit have been removed in FIG. 10D for clarity. The rotor hub 1300 includes a plurality of support shoulders positioned longitudinally along the length of the shaft 1302. A first bearing support shoulder 1320 engages and supports the bearing unit 912. A first centering shoulder 1322 couples to and supports the first side wall 1208 of the back iron circuit 1200. A center shoulder 1324 engages with and supports the inner cylindrical walls 1207 and 1211 of the back iron circuit 1200. A second centering shoulder 1326 supports the second side wall 1212 of the back iron circuit 200. A second bearing support shoulder 1328 is designed to engage with and support the second bearing unit 914. In certain embodiments, a keyway 1330 (see FIG. 10B) may be defined in either end of the rotor shaft 1302.

In the embodiment illustrated in FIGS. 10A through 10D, the coil assembly 1500 is the stator. In other configurations, the coil assembly 1500 may be a rotor. Furthermore, the embodiments as illustrated is only one way of configuring and supporting the coil assembly 1500. In other embodiments the coil assembly 1500 may be supported by support ring extending through a center slot 410 between the outer cylindrical walls 206 and 210 from the coil assembly to an exterior casing or housing (FIGS. 7A and 7B). In yet other embodiments when the coil assembly 500 is functioning as a rotor, the coil assembly may be supported by a support ring extending through a center slot between the inner cylindrical walls 208 and 218 from the coil assembly to the a shaft. The exact configuration depends on design choices as to whether the coil assembly is to be the stator or the rotor.

Advantages of Certain Embodiments

In sum, certain disclosed embodiments have several advantages when compared to traditional motors and generators. Surrounding the coils with magnets as described above creates more flux density and the forces are now all in the direction of motion which may create more torque, minimize vibration, and minimize noise—as compared to conventional motors where forces may try to pull the coil downwards or push it upwards (depending on the polarity), not in the direction of motion. As discussed above, most of the magnetic fields generated are in the direction of motion so there is little, if any, wasted field structure. Continuous torque and continuous power, therefore, are greatly increased. Furthermore, continuous torque density, continuous power density by volume, and continuous power density by weight are also increased when compared to conventional electric motors.

In certain embodiments, the equivalent full torque is available at start with no or minimal locked rotor current losses. The permanent magnet configuration has reduced inrush current at start.

In certain embodiments, the coil assembly may be compact and yet the coils are easily cooled because they are surrounded by an effective heat sink. Because there is little to no overlap of the coil windings, there is little, if any unwanted field induction—which also contributes to a more efficient design. One of the advantages of this configuration over conventional motors is that the end turns (in this case the radial section of the coils) are part of the "active section" of the invention. In conventional motors, the axial length of the copper conductor is the section that produces power. The end turns are a penalty, adding weight and losses, but not producing power because the end region fields are not effectively linking the end windings. However, in the above disclosed embodiments, the entire coil winding is effectively used to produce torque due to the side wall or axial magnets which are axially magnetized—efficiently utilizing the copper windings.

As discussed above, surrounding the coils with magnets as described above creates more flux density and the forces are now all in the direction of motion which may create more torque, minimize vibration, and minimize noise—as compared to conventional motors where forces may try to pull the coil downwards or push it upwards (depending on the polarity), not in the direction of motion.

Continuous torque and continuous power, therefore, are greatly increased. Furthermore, continuous torque density, continuous power density by volume, and continuous power density by weight are also increased when compared to conventional electric motors.

In a "DC" configuration, the motor may run independent of power line frequency or manufactured frequencies reducing the need for expensive pulse width modulated drive controllers or similar controllers.

The foregoing description of the embodiments of the invention has been presented for the purposes of illustration and description. It is not intended to be exhaustive or to limit the invention to the precise form disclosed. Many combinations, modifications and variations are possible in light of the above teaching. For instance, in certain embodiments, each of the above described components and features may be individually or sequentially combined with other components or features and still be within the scope of the present invention. Undescribed embodiments which have interchanged components are still within the scope of the present invention. It is intended that the scope of the invention be limited not by this detailed description, but rather by the claims or future claims supported by the disclosure.

For instance, in some embodiments there may be a rotary motor/generator comprising: a toroidal magnetic cylinder radially arranged about an axial axis to form a circular path comprising of at least a first magnetic tunnel segment, wherein the first magnetic tunnel segment comprises: a first rotor component having a magnetic pole orientation that points generally towards an interior of the first magnetic tunnel segment; a first opposing rotor component having a magnetic pole orientation that points generally towards the interior of the first magnetic tunnel segment and positioned a predetermined distance from the first rotor component; a first inner rotor component generally spanning between the first rotor component and the first opposing rotor component and having a magnetic pole orientation that points generally towards the interior of the first magnetic tunnel segment; a first outer rotor component generally spanning between the first rotor component and the first opposing rotor component, positioned radially away from the first inner rotor component, and having a magnetic pole orientation that points generally towards the interior of the first magnetic tunnel segment; wherein like magnetic poles of magnets forming the first rotor component and magnets forming the first opposing rotor component are of an opposite magnetic polarity orientation than the like poles of magnets forming the first inner rotor component and magnets forming the first outer rotor component such that the first magnetic tunnel has a NSNS magnetic pole configuration; and a coil assembly positioned within the circular path.

The rotary motor/generator as described above, wherein the toroidal magnetic cylinder further comprises a second magnetic tunnel segment radially arranged about the axial axis and positioned adjacent to the first magnetic tunnel segment, wherein the second magnetic tunnel segment comprises: a second rotor component having a magnetic pole orientation that points generally towards an interior of the second magnetic tunnel segment; a second opposing rotor component having a magnetic pole orientation that points generally towards the interior of the second magnetic tunnel segment and positioned the predetermined distance from the second rotor component; a second inner rotor component generally spanning between the second rotor component, the second inner rotor component having a magnetic pole orientation that points generally towards the interior of the second magnetic tunnel segment; a second outer rotor component generally spanning between the second rotor component and the second opposing rotor component, positioned radially away from the second inner rotor component, and having a magnetic pole orientation that points generally towards the interior of the second magnetic tunnel segment; wherein like magnetic poles of magnets forming the second rotor component and magnets forming the second opposing rotor component are of an opposite magnetic polarity orientation than the like poles of magnets forming the second inner rotor component and magnets forming the second outer rotor component, where the like magnetic poles of magnets forming the second magnetic tunnel segment are orientated in an opposite direction from the like magnet poles of the magnets forming the first magnetic tunnel segment such that the second magnetic tunnel segment has a SNSN magnetic pole configuration.

The invention claimed is:

1. A method of producing mechanical rotation, the method comprising:
   forming a first area of magnetic concentration within a first interior cavity defined by an first outer magnetic cylinder wall having a first magnetic pole facing the interior cavity, a first inner magnetic cylinder wall having a second magnetic pole facing the interior cavity, a first magnetic wall having a third magnetic pole facing the interior cavity, and a first opposing magnetic wall having a fourth magnetic pole facing the interior cavity, wherein the first and second magnetic poles are of an opposite magnetic pole orientation from the third and fourth magnetic poles to form a NSNS magnetic pole configuration;
   positioning a coil within the first interior cavity;
   applying a current in a first direction to the coil to cause the coil to rotate relative to the first interior cavity; and
   coupling a longitudinal shaft to the coil such that as the coil rotates, the longitudinal shaft rotates.

2. The method of producing mechanical rotation of claim 1 further comprising:
   forming a second area of magnetic concentration within a second interior cavity positioned circumferentially adjacent to the first interior cavity defined by a second outer magnetic cylinder wall having a fifth magnetic pole facing the interior cavity, a second inner magnetic cylinder wall having a sixth magnetic pole facing the interior cavity, a second magnetic wall having a seventh magnetic pole facing the interior cavity, and a second opposing magnetic wall having a eighth magnetic pole facing the interior cavity, wherein the fifth and sixth magnetic poles are of an opposite magnetic pole orientation from the seventh and eight magnetic poles to form a SNSN magnetic pole configuration;
   applying a current in a first direction to the coil to cause the coil to move to the second interior cavity; and
   applying a current in a second direction to the coil when the coil is within the second interior cavity to move the coil out of the second interior cavity.

3. A method of producing electric current, the method comprising:
   forming a first area of magnetic concentration within a first interior cavity defined by an first outer magnetic cylinder wall having a first magnetic pole facing the interior cavity, a first inner magnetic cylinder wall having a second magnetic pole facing the interior cavity, a first magnetic wall having a third magnetic pole facing the interior cavity, and a first opposing magnetic wall having a fourth magnetic pole facing the interior cavity, wherein the first and second magnetic poles are of an opposite magnetic pole orientation from the third and fourth magnetic poles to form a NSNS magnetic pole configuration;
   rotating a coil within the first interior cavity; and
   extracting from the coil a current having a first direction as the coil moves through the first interior cavity.

4. The method of producing mechanical rotation of claim 3 further comprising:
   forming a second area of magnetic concentration within a second interior cavity defined by an second outer magnetic cylinder wall having a fifth magnetic pole facing the interior cavity, a second inner magnetic cylinder wall having a sixth magnetic pole facing the interior cavity, a second magnetic wall having a seventh magnetic pole facing the interior cavity, and a second opposing magnetic wall having a eighth magnetic pole facing the interior cavity, wherein the fifth and sixth magnetic poles are of opposite polarities from the seventh and eight magnetic poles, wherein the first through fourth magnetic poles are of an opposite magnetic pole orientation than the fifth through eight magnetic poles to form a SNSN magnetic pole configuration;
   rotating the coil within the second interior cavity; and
   extracting from the coil a current having a second direction when the coil moves through the second interior cavity.

* * * * *